(12) United States Patent
Chino et al.

(10) Patent No.: US 7,664,584 B2
(45) Date of Patent: Feb. 16, 2010

(54) STEERING CONTROL SYSTEM

(75) Inventors: Naotaka Chino, Kanagawa (JP); Taku Suzuki, Kanagawa (JP); Noriki Kubokawa, Kanagawa (JP); Takaaki Eguchi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 62 days.

(21) Appl. No.: 11/363,697

(22) Filed: Feb. 28, 2006

(65) Prior Publication Data

US 2006/0200289 A1     Sep. 7, 2006

(30) Foreign Application Priority Data

Mar. 1, 2005   (JP)  ............................. 2005-056513
Mar. 16, 2005  (JP)  ............................. 2005-075667

(51) Int. Cl.
*B62D 6/00*   (2006.01)
*B62D 3/00*   (2006.01)
*B62D 7/16*   (2006.01)
*B62D 1/00*   (2006.01)
*B62D 1/28*   (2006.01)
*B62D 5/02*   (2006.01)
*B62D 5/04*   (2006.01)
*B62D 5/20*   (2006.01)

(52) U.S. Cl. ............................. 701/41; 701/1; 180/204; 180/6.24; 180/6.44; 180/402; 180/405; 180/419; 180/444

(58) Field of Classification Search ................. 180/402, 180/405, 406, 6–6.7, 9, 419, 421; 701/41, 701/42, 43, 44; 56/15.4; 73/117.01, 117.02; 74/640, 388, 484; 114/144, 146, 164; 244/17.17, 244/17.19; 280/5.51
See application file for complete search history.

(56) References Cited

U.S. PATENT DOCUMENTS 4,771,846 A  *  9/1988  Venable et al. ............... 180/422

(Continued)

FOREIGN PATENT DOCUMENTS

EP         1426266 A2    6/2004

(Continued)

OTHER PUBLICATIONS

European Patent Search Report No. 06251121.7-2425 dated Jun. 19, 2006.

(Continued)

*Primary Examiner*—Jack W. Keith
*Assistant Examiner*—Jonathan M Dager
(74) *Attorney, Agent, or Firm*—Young Basile

(57) ABSTRACT

A steering control system comprises a steering component, a turning component, and a backup mechanism for alternately mechanically separating and linking steering and turning components. A steer-by-wire control unit is provided for executing steer-by-wire control of a turning actuator to a turning angle corresponding to a steering condition and control of a steering reaction force actuator for imparting steering reaction force corresponding to the turning condition. A steering assistance control unit is selectively linked to the backup mechanism to executing steering assistance control for at least one of the steering reaction force actuator and the turning actuator. A control switching unit is provided for controlling a shift, under predetermined conditions, between control by the steer-by-wire control unit and control by the steering assistance control unit.

12 Claims, 12 Drawing Sheets

U.S. PATENT DOCUMENTS

| | | | |
|---|---|---|---|
| 5,247,441 A * | 9/1993 | Serizawa et al. | 701/41 |
| 5,347,458 A * | 9/1994 | Serizawa et al. | 701/41 |
| 6,041,882 A * | 3/2000 | Bohner et al. | 180/402 |
| 6,041,884 A * | 3/2000 | Shimizu et al. | 180/443 |
| 6,176,341 B1 * | 1/2001 | Ansari | 180/402 |
| 6,213,246 B1 * | 4/2001 | Bohner et al. | 180/403 |
| 6,213,248 B1 * | 4/2001 | Kawaguchi et al. | 180/446 |
| 6,269,903 B1 * | 8/2001 | Bohner et al. | 180/406 |
| 6,283,243 B1 * | 9/2001 | Bohner et al. | 180/406 |
| 6,285,936 B1 * | 9/2001 | Bohner et al. | 701/41 |
| 6,424,900 B2 * | 7/2002 | Murray et al. | 701/48 |
| 6,442,462 B1 * | 8/2002 | Nishizaki et al. | 701/41 |
| 6,481,526 B1 * | 11/2002 | Millsap et al. | 180/402 |
| 6,496,762 B2 * | 12/2002 | Kurishige et al. | 701/41 |
| 6,554,095 B2 * | 4/2003 | Zheng et al. | 180/402 |
| 6,557,662 B1 * | 5/2003 | Andonian et al. | 180/402 |
| 6,580,989 B1 * | 6/2003 | Husain et al. | 701/41 |
| 6,612,395 B2 * | 9/2003 | Moser et al. | 180/446 |
| 6,659,218 B2 * | 12/2003 | Thomas et al. | 180/402 |
| 6,681,166 B2 * | 1/2004 | Kato et al. | 701/41 |
| 6,799,654 B2 * | 10/2004 | Menjak et al. | 180/402 |
| 6,923,288 B2 * | 8/2005 | Szabela | 180/402 |
| 6,929,086 B1 * | 8/2005 | Husain et al. | 180/413 |
| 7,004,279 B2 * | 2/2006 | Shitamitsu et al. | 180/402 |
| 7,004,280 B2 * | 2/2006 | Shirato et al. | 180/446 |
| 7,007,769 B2 * | 3/2006 | Hara et al. | 180/402 |
| 7,124,010 B2 * | 10/2006 | Egami | 701/93 |
| 7,130,728 B2 * | 10/2006 | Suzuki | 701/41 |
| 7,308,346 B2 * | 12/2007 | Sugitani | 701/41 |
| 7,308,964 B2 * | 12/2007 | Hara et al. | 180/446 |
| 2002/0092696 A1 * | 7/2002 | Bohner et al. | 180/405 |
| 2002/0157894 A1 * | 10/2002 | Hjelsand et al. | 180/446 |
| 2002/0161499 A1 * | 10/2002 | Radamis et al. | 701/41 |
| 2002/0162700 A1 * | 11/2002 | Moser et al. | 180/443 |
| 2003/0019685 A1 * | 1/2003 | Graber et al. | 180/402 |
| 2003/0060950 A1 * | 3/2003 | McKeown et al. | 701/29 |
| 2003/0114969 A1 * | 6/2003 | Dominke et al. | 701/41 |
| 2003/0141134 A1 * | 7/2003 | Sherwin et al. | 180/402 |
| 2003/0183440 A1 * | 10/2003 | Thomas et al. | 180/402 |
| 2003/0187559 A1 * | 10/2003 | Higashi et al. | 701/41 |
| 2004/0039508 A1 * | 2/2004 | Husain et al. | 701/41 |
| 2004/0128042 A1 * | 7/2004 | Takahashi et al. | 701/41 |
| 2004/0238257 A1 * | 12/2004 | Takahashi et al. | 180/402 |
| 2004/0238258 A1 * | 12/2004 | Ono et al. | 180/402 |
| 2004/0262073 A1 | 12/2004 | Husain et al. | |
| 2005/0000749 A1 * | 1/2005 | Sato et al. | 180/402 |
| 2005/0045413 A1 * | 3/2005 | Shitamitsu et al. | 180/402 |
| 2005/0072621 A1 * | 4/2005 | Hara et al. | 180/444 |
| 2005/0082108 A1 * | 4/2005 | Husain | 180/402 |

FOREIGN PATENT DOCUMENTS

| | | |
|---|---|---|
| EP | 1481874 A2 | 12/2004 |
| EP | 1486397 A2 | 12/2004 |
| EP | 1510436 A | 3/2005 |
| JP | 2004-090783 | 3/2004 |

OTHER PUBLICATIONS

English Abtract for JP2004-090783.

* cited by examiner

Turn Control Blocks At SBW

Turn Servo Control Block At SBW

Reaction Force Control Block At SBW

Reaction Force Servo Control Block At SBW

Turn Control Block At EPS

Turn Servo Control Block At EPS

Turning Torque Correction Value Map

Turn Torque Correction Value: Steer Angular Velocity Gain

Turn Torque Correction Value: Axial Force Change Gain

Turn Torque Correction Value: Vehicle Motion Amount Gain

Turning Torque Correction Value Map

Turn Torque Correction Value: Steering Angular Velocity Gain

Turn Torque Correction Value: Axial Force Change Gain

Turn Torque Correction Value: Vehicle Motion Amount Gain

Steering Reaction Force Torque Correction Value Map

Steer Reaction Force Torque Correction Value: Steering Angular Velocity

Steer Reaction Force Correction Value: Axial Force Change Gain

Steer Reaction Force Torque Correction Value: Vehicle Motion Amount Gain

STEERING CONTROL SYSTEM

RELATED APPLICATIONS

The disclosures of Japanese Patent Application No. 2005-056513, filed Mar. 1, 2005, and Japanese Patent Application No. 2005-075667, filed Mar. 16, 2005, including their specifications, claims and drawings, are incorporated herein by reference in their entireties.

FIELD

Disclosed herein is a steering control system of the type employing a steer-by-wire mechanism and including a steering component having a steering wheel and a steering reaction force actuator, and a turning component having vehicle turning wheels and a turning actuator, the steering and turning components being mechanically linked and unlinked by operation of a backup mechanism.

BACKGROUND

Recently vehicle steering devices have been proposed that provide so-called steer-by-wire (hereafter, "SBW") systems and disengage the mechanical link between the steering wheel and the vehicle turning wheels to activate a steering system employing an electronic route. With these types of SBW mechanisms, it is important to provide a fail-safe countermeasure to deal with instances in which, for example, an irregularity arises in the actuator used for steering reaction force. In this regard, in instances of irregularity, system check, failure diagnosis, or maximum turning angle execution, configurations have been proposed that function as a regular electromotive power steering device (hereafter, "EPS"), which suspends control by a reaction force controller, engages a backup mechanism for mechanically linking the steering members and the vehicle turning wheels, switches control in order to provide steering assistance to the steering control component, and controls the turning actuator. See, for example, Japanese Laid-open Patent Application No. 2004-090783, published Mar. 25, 2004 (filed Aug. 30, 2002).

SUMMARY

A steering control system is disclosed that comprises a steering component having a steering wheel and a steering reaction force actuator, a turning component having vehicle turning wheels and a turning actuator, and a backup mechanism for alternately mechanically separating and linking the steering and turning components. There is also provided a steer-by-wire control unit that is selectively separated from the backup mechanism for executing steer-by-wire control of the turning actuator to a turning angle corresponding to the steering condition and control of the steering reaction force actuator for imparting steering reaction force corresponding to the turning condition, a steering assistance control unit selectively linked to the backup mechanism for executing steering assistance control for at least one of the steering reaction force actuator and the turning actuator, and a control switching unit for controlling a shift, upon attainment of predetermined conditions, between control by the steer-by-wire control unit and control by the steering assistance control unit. The control switching unit, upon the shift of control, between the time of a separation/linkage command to the backup mechanism and the time of completion of separation/linkage, selectively sets as the correction amount the variation equivalence of the turning torque to be applied to the turning wheels of a vehicle after the completion and selectively executes correction of turning torque.

BRIEF DESCRIPTION OF THE DRAWINGS

These and other features and advantages of the present steering control system will be apparent from the ensuing description taken in conjunction with the accompanying drawings, in which.

DETAILED DESCRIPTION OF THE ILLUSTRATED EMBODIMENT

Figure 1:
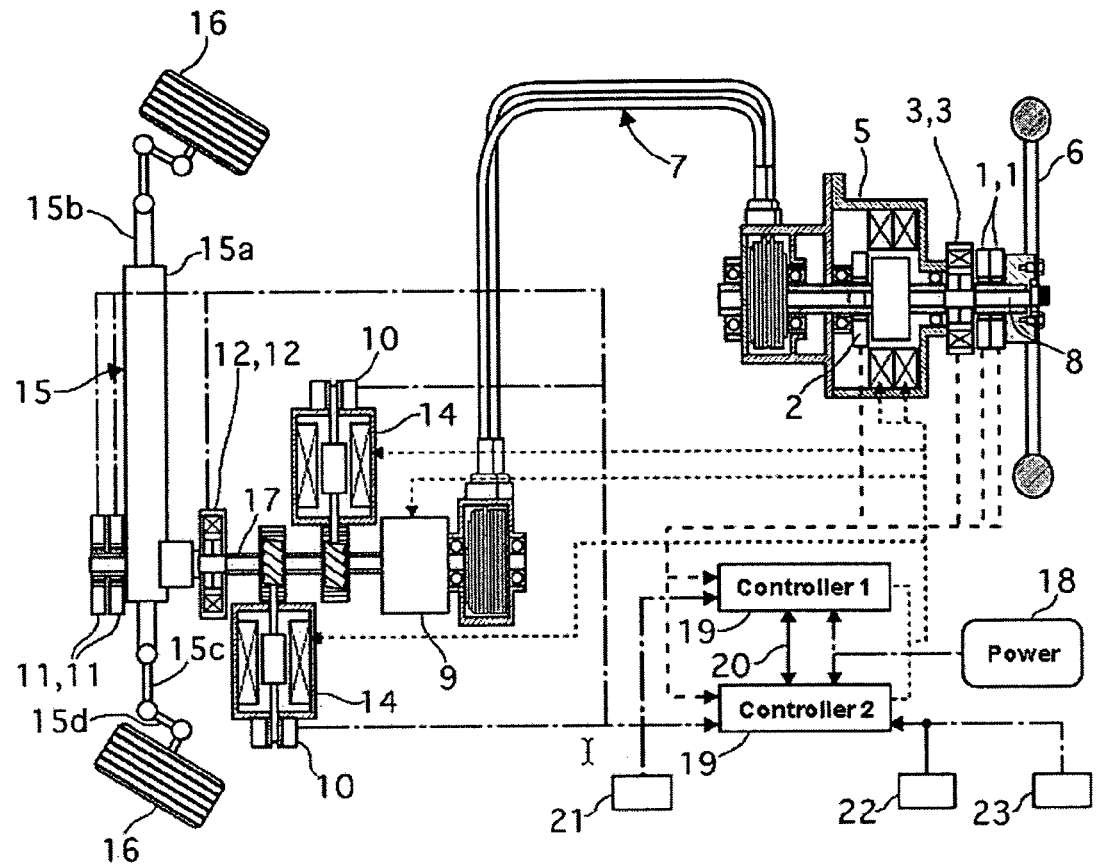
FIG. 1 is a schematic drawing of a steer-by-wire mechanism in which the present steering control system is implemented according to an embodiment thereof.
Figure 2:
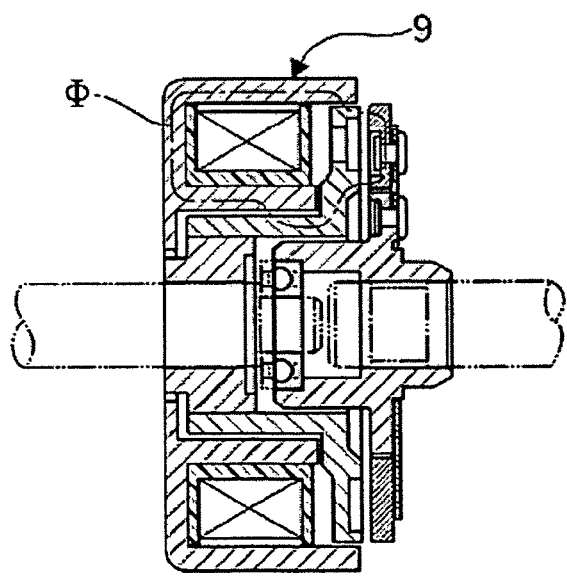
FIG. 2 is an enlarged diagrammatic sectional view of an example of a backup clutch for use in the steer-by-wire mechanism of FIG. 1.
Figure 3:
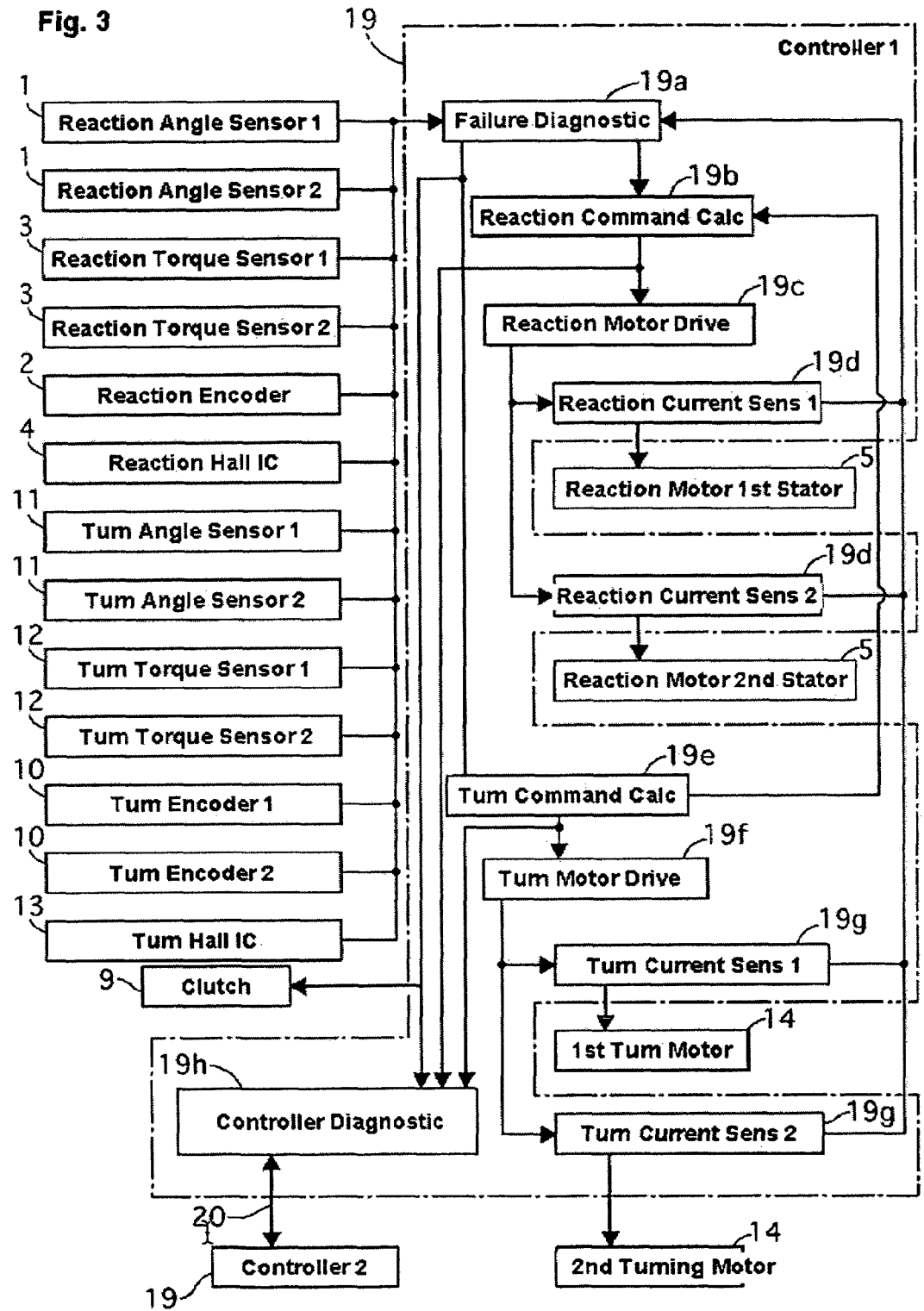
FIG. 3 is a block diagram showing the control structure employing SBW control according to the illustrated embodiment.

FIG. 1 is a schematic drawing showing a steer-by-wire mechanism (hereafter, "SBW mechanism") implemented by the present steering control system according to an illustrated exemplary embodiment. FIG. 2 is a sectional drawing showing an example of the backup clutch of the steering control system according to the illustrated embodiment of FIG. 1. FIG. 3 is a block diagram showing the overall system according to the illustrated embodiment. This embodiment comprises (1) a reaction force device (steering component), (2) a backup device (backup mechanism), (3) a turning device (turning component), and (4) a controller. These are described in detail below.

The reaction force device (steering component) is formed by a steering angle sensor 1,1, an encoder 2, a torque sensor 3,3 (steering torque detection unit), Hall IC 4, and a reaction force motor 5 (steering reaction force actuator).

Steering angle sensor 1,1 is a unit for detecting the steering angle of steering wheel 6, and is provided in a duplex system of two torque sensors, steering angle sensor 1 and steering angle sensor 2, disposed in a column shaft 8 that combines a cable column 7 and a steering wheel 6, as described below. In short, steering angle sensor 1,1 is placed between steering wheel 6 and torque sensor 3,3, and it is capable of detecting the steering angle without the influence of angle change returned by torque sensor 3,3. This steering angle sensor 1,1 employs an absolute-type resolver, etc.

Torque sensor 3,3 forms a duplex system with two torque sensors, torque sensor 1 and torque sensor 2, and it is arranged between steering angle sensor 1 and reaction force motor 5. Though not specifically shown in the drawings, torque sensor 3,3 may, for example, be composed of a torsion bar extending in the axial direction, a first shaft on the same axis as the torsion bar, a second shaft on the same axis as the first shaft and torsion bar and connected to the opposite end of the torsion bar, a first magnetic body fixed to the first shaft, a second magnetic body fixed to the second shaft, a coil in opposition to the first magnetic body and the second magnetic body, an enclosure around the coil, and a third magnetic body forming an electromagnetic circuit with the first magnetic body and the second magnetic body. Then, based on coil twisting as operated by the torsion bar, inductance is transformed corresponding to relative position change between the first magnetic body and the second magnetic body, and based on this inductance, torque is detected by the output signal.

Reaction force motor 5 is a steering reaction force actuator for applying reaction force to steering wheel 6, and is comprises a single rotor/single stator electric motor having column shaft 8 as its rotational shaft, and its casing is fixed to a suitable part of the vehicle body. This reaction force motor 5 employs a brushless motor, and encoder 2 and Hall IC 4 are added for use with the brushless motor. In this arrangement, motor drive generating motor torque is possible with only Hall IC 4, but small torque fluctuations would be generated, and this would adversely impact the steering reaction force sensation. For that reason, in order to execute reaction force control more smoothly and effectively, encoder 2 is installed on column shaft 8, and execution of motor control reduces minute torque fluctuations, thereby realizing an improvement in steering reaction force sensation. Moreover, a resolver could be implemented in place of encoder 2.

The backup device enables mechanical linkage and disengagement of the reaction force device and the turning device, and is composed of cable column 7 and backup clutch 9.

In backup mode in which backup clutch 9 is operated, cable column 7 is a mechanical backup mechanism constructed to provide a column shaft function to transfer torque even while turning with avoidance of interference with members interposed between the reaction force device and the turning device. Column shaft 7 is configured so that two inner cables (not shown) are fixed to two reels that wind in opposite directions, and the two inner cables are routed to the two reel cases through outer tubes having both ends fixed.

Backup clutch 9 is disposed at the turning device. FIG. 2 is a diagrammatic sectional drawing of backup clutch 9. This backup clutch 9 includes both an electromagnetic clutch and a mechanical clutch, and at clutch engagement, the activated condition of the electromagnet forces the initial slide to contact the friction plate, which friction plate shifts the cam of the mechanical coupling part, and engagement is mechanically strengthened. At release of engagement, the electromagnet is deactivated, and release is affected by moving either the input or output of the cam of the mechanical coupling part. Engagement backup clutch 9 enables transfer of torque from the reaction force device and torque from the turning device through cable column 7 and backup clutch 9.

The turning device includes as encoder 10,10, a turning angle sensor 11,11, a torque sensor 12,12, Hall IC 13, a turning motor 14,14 (turning actuator), steering mechanism 15, and vehicle turning wheels 16,16.

The steering angle sensors 11,11 and the torque sensors 12,12 are disposed on the axis of a pinion shaft 17 to which the backup clutch 9 is attached at one end and a pinion gear is formed on the other end. Steering angle sensor 11,11 forms a duplex system as in steering angle sensor 1,1, and an absolute resolver is employed for detecting revolutions of the shaft. In addition, torque sensor 12,12 forms a duplex system as in torque sensor 3,3, and is employed to detect torque by conversion of inductance. By placing the steering angle sensor 11,11 downstream of the pinion gear and the torque sensor 12,12 upstream thereof, the system is not affected by the influence of angle changes by the twisting of torque sensor 12,12 at turning angle detection by steering angle sensor 11,11.

Turning motor 14,14 is constructed to assign turning torque to pinion shaft 17 during motor drive by a pinion gear on the motor shaft that engages with the worm gear established at an intermediate position with torque sensor 12,12 and backup clutch 9 of pinion shaft 17. This turning motor 14,14 is a duplex system, and is a brushless motor formed by a first turning motor element 14 and a second turning motor element 14. In addition, encoder 10,10 and Hall IC 13 accompany use of the brushless motor as with reaction force motor 5.

Steering mechanism 15 is a turning mechanism for left and right vehicle turning wheels 16,16 by rotation of pinion shaft 17, and is formed by a rack shaft 15b comprising a rack gear engaged with the pinion gear of pinion shaft 17 and passed through rack tube 15a, by a tie rod 15c,15c joined to both ends of a rack shaft 15b extended in both the left and right vehicle directions, and by a knuckle arm 15d,15d joined to tie rod 15c,15c on one end and joined to vehicle turning wheels 16,16 at the opposing end.

The controller forms a duplex system by including a pair of controllers 19,19 performing processing operations and energized by a power supply 18.

As shown in FIG. 3, controller 19 receives input of detected values from the reaction force device, specifically from steering angle sensor 1,1, encoder 2, torque sensor 3,3, and Hall IC 4 as well as from the turning device, specifically turning device encoder 10,10, steering angle sensor 11,11, torque sensor 12,12, and Hall IC 13.

Controller 19 includes a failure diagnostic component 19a, which performs failure diagnosis for turning control and reaction force control during steer-by-wire control (hereafter, "SBW control") with clutch disengagement, performs failure diagnosis during electromotive power steering control (hereafter, "EPS control") which is assistance torque control with clutch engagement, and performs diagnosis of shift control from SBW control to EPS control during failure diagnosis.

Aside from failure diagnostic component 19a, controller 19 possesses a reaction force command value operation component 19b, a reaction force motor drive component 19c, a reaction force device current sensor 19d, a turning command value operation component 19e, a turning motor drive component 19f, a turning device current sensor 19g, 19g, and a controller diagnostic component 19h. Both controllers 19,19 are reciprocally connected through bi-directional communications line 20 to enable information exchange.

Furthermore, both controllers 19,19 receive input of sensor information from sensors such as a yaw rate/lateral G sensor 21 (vehicle motion amount detection unit), a speed sensor 22 detecting vehicle speed, and a reaction force motor temperature sensor 23 detecting the temperature of reaction force motor 5, as illustrated in FIG. 1.

Figure 4:
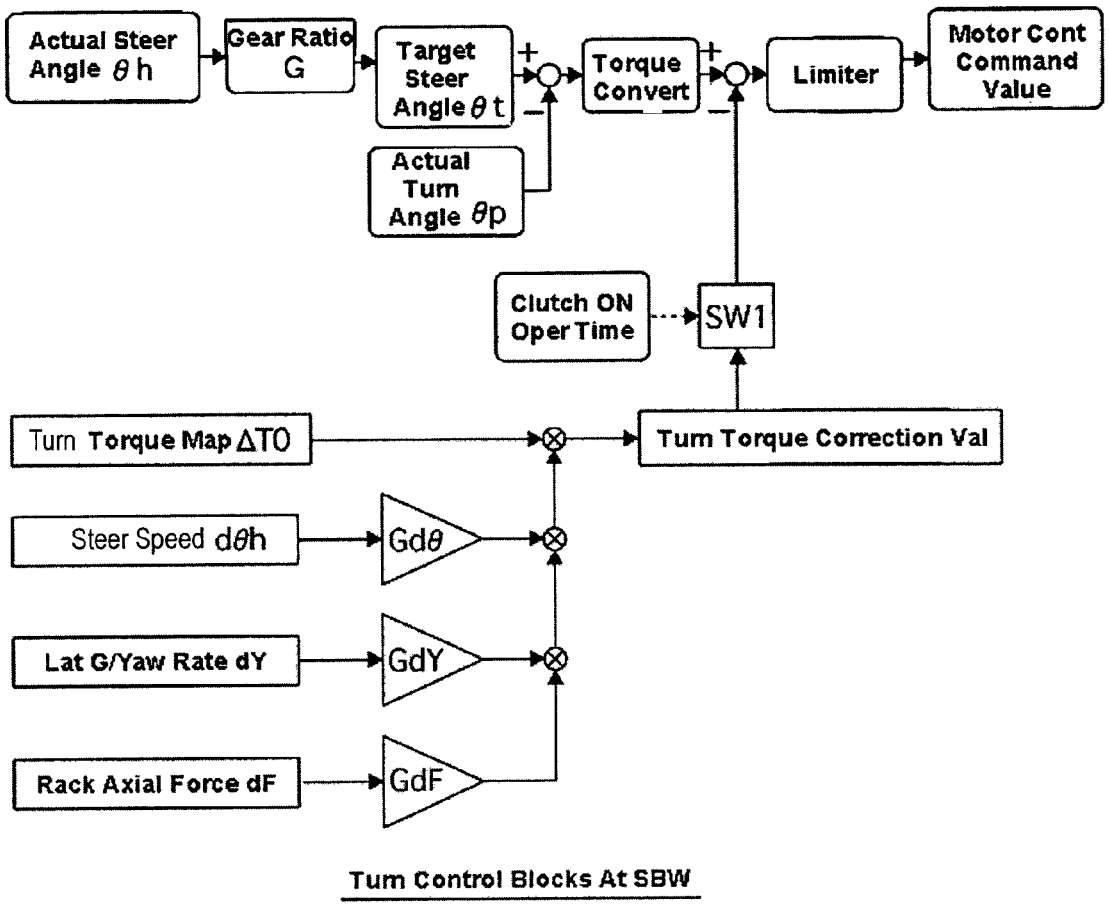
FIG. 4 is a block diagram showing SBW control according to the illustrated embodiment.
Figure 5:
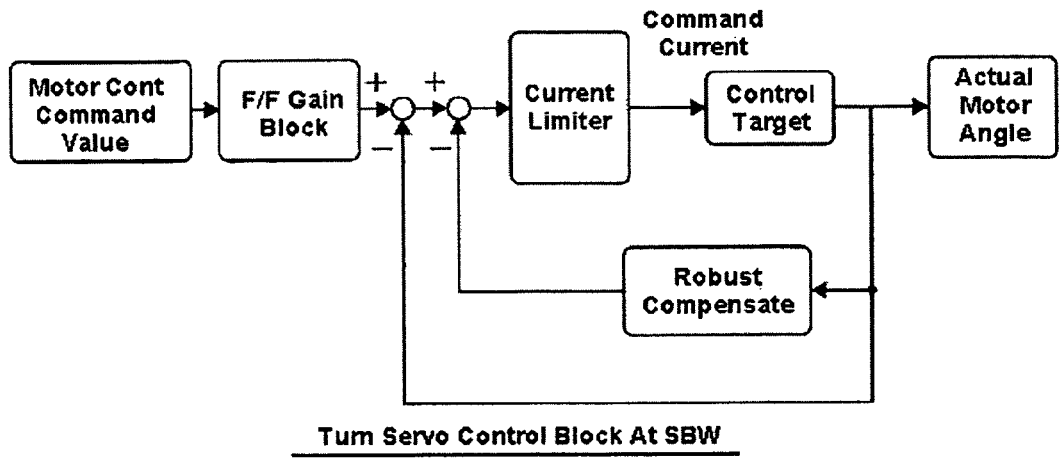
FIG. 5 is a block diagram showing turning servo control during SBW control according to the illustrated embodiment.

FIG. 4 and FIG. 5 are block diagrams showing "Turning Control During SBW Control" and "Turning Servo Control During SBW Control", respectively (turning torque control during SBW control), performed by controllers 19,19 of the steering control system according to the illustrated embodiment. The following is a description of turning control during SBW control and turning torque correction control at the shift from SBW control to EPS control according to the illustrated embodiment, with reference to FIGS. 4 and 5.

As shown in FIG. 4, turning control at SBW control converts to turning torque the deviation between the target turning angle $\theta t$ derived by multiplying the gear ratio G set corresponding to a factor such as vehicle speed by actual steering angle $\theta h$ of steering wheel 6 and the actual turning angle $\theta p$ obtained from the rotation angle of turning motor 14, and limiter processing is executed to set the motor control command value. Then, as shown in FIG. 5, based on the turning servo control derived from feed forward control+feed back control+robust compensation, the command current is obtained from the motor control command value, and turning motor 14 is driven.

Then turning torque correction control at time of shift from SBW control to EPS control is performed by subtraction of turning torque correction value $\Delta T$ at first switch SW1 activation to ON at time of clutch engagement (period between engagement command and engagement completion), as shown in the turning control block diagram of FIG. 4. At this point, turning torque correction value $\Delta T$ is calculated by combining steering angle speed gain $Gd\theta$, axial force change gain $GdF$, and vehicle motion amount gain $GdY$ with turning torque correction standard value $\Delta TO$. (See FIGS. 11 to 14.)

Figure 6:
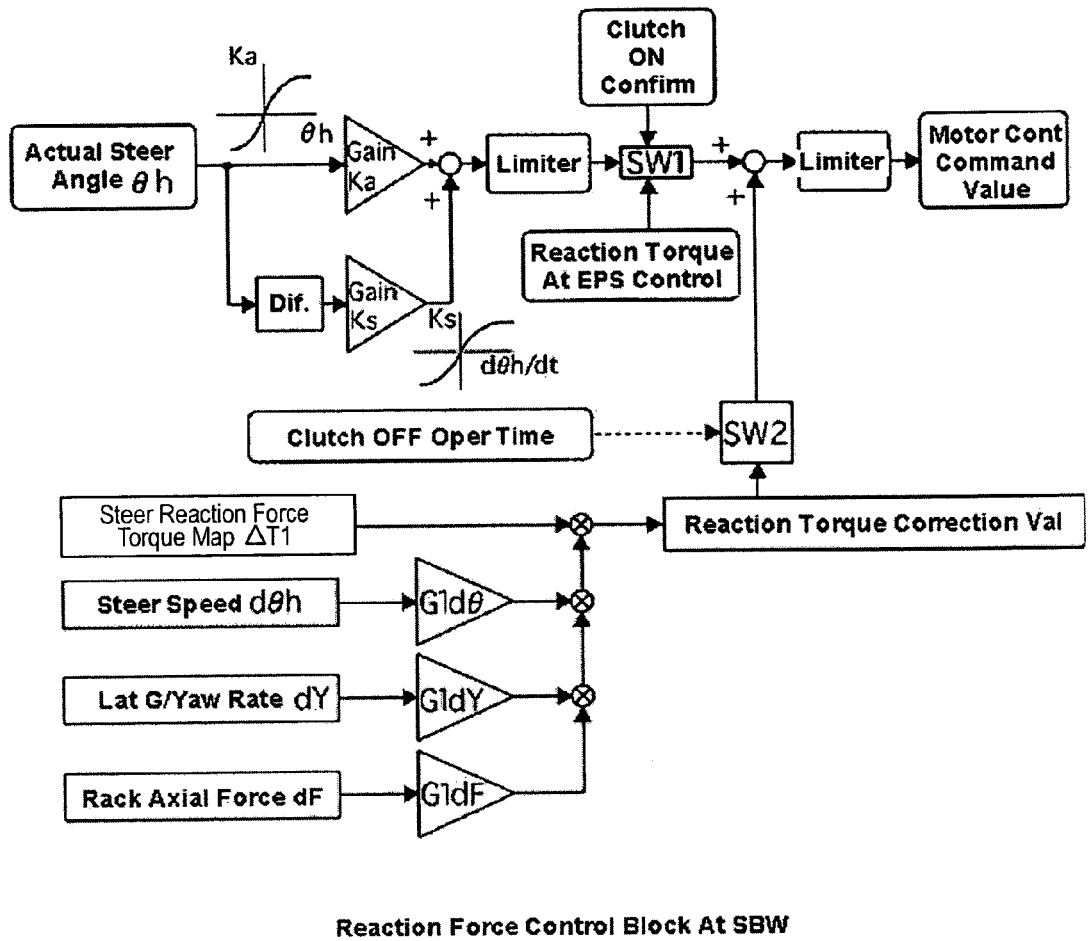
FIG. 6 is a block diagram showing reaction force control during SBW control according to the illustrated embodiment.
Figure 7:
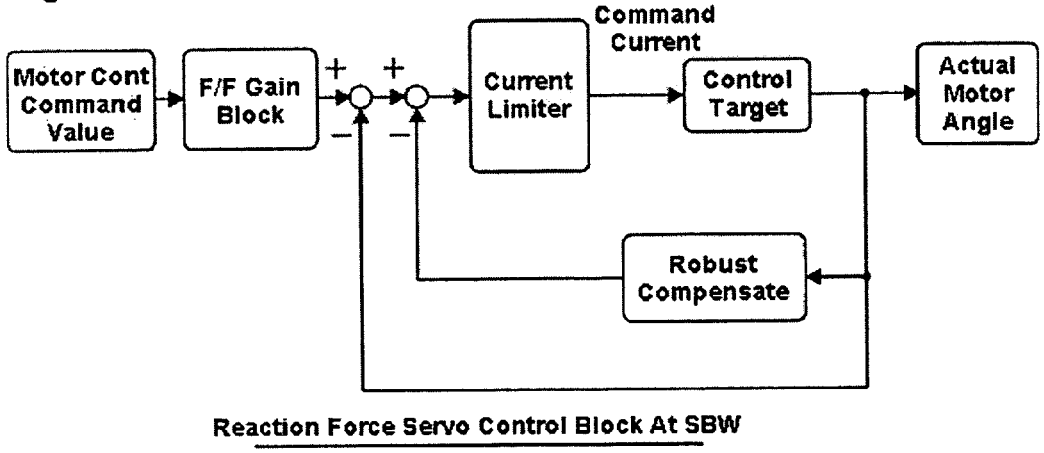
FIG. 7 is a block diagram showing reaction force servo control during SBW control according to the illustrated embodiment.

FIG. 6 and FIG. 7 are block diagrams showing "Reaction Force Control During SBW Control" and "Reaction Force Servo Control During SBW Control", respectively (steering reaction force control during SBW control), performed by controllers 19,19 of the steering control system according to the illustrated embodiment. The following is a description of reaction force control during SBW control, reaction force control at a shift from SBW control to EPS control, and reaction force control during recovery from EPS control to SBW control for the illustrated embodiment, with reference to FIGS. 6 and 7.

As shown in FIG. 6, reaction force control during SBW control sets the steering reaction force torque corresponding to the steering condition of vehicle steering wheels 16,16 by multiplying the value of gain Ka by actual steering angle $\theta h$ of steering wheel 6 and gain Ks by actual steering angular velocity $d\theta h/dt$ and combining the resulting values, and it executes limiter processing to set the motor control command value. Then, as shown in FIG. 7, based on the reaction force servo control derived from feed forward control+feed back control+robust compensation, the command current is obtained from the motor control command value, and reaction force motor 5 is driven.

Then reaction force control at the time of shift from SBW control to EPS control is performed by setting the reaction force torque value (zero, or torque for identical direction to steering torque direction) at first switch SW1 activating to ON through clutch ON confirmation, as shown in the steering reaction control block diagram of FIG. 6.

In addition, as shown in the steering reaction control block diagram of FIG. 6, reaction force control during recovery from EPS control to SBW control is performed by adding steering reaction force torque correction value $\Delta T'$ at second switch SW2 activation to ON at the time of clutch OFF operation (the period between release command and release completion). At this point, steering reaction force torque correction value ΔT' is calculated by combining steering angular velocity gain G1dθ, axial force change gain G1dθ, and vehicle motion amount gain G1dY with steering reaction force torque correction standard value ΔT1. (See FIGS. 19 to 22.)

Figure 8:
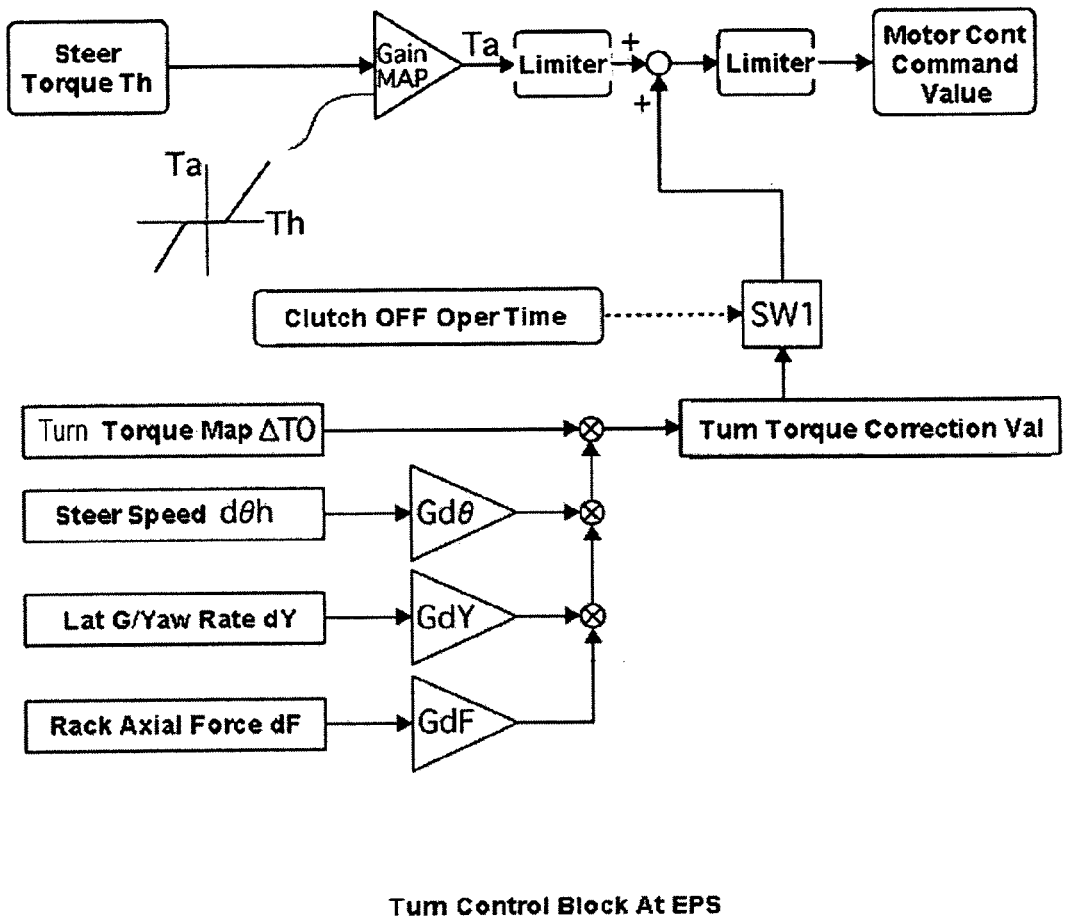
FIG. 8 is a block diagram showing turning control during EPS control according to the illustrated embodiment.
Figure 9:
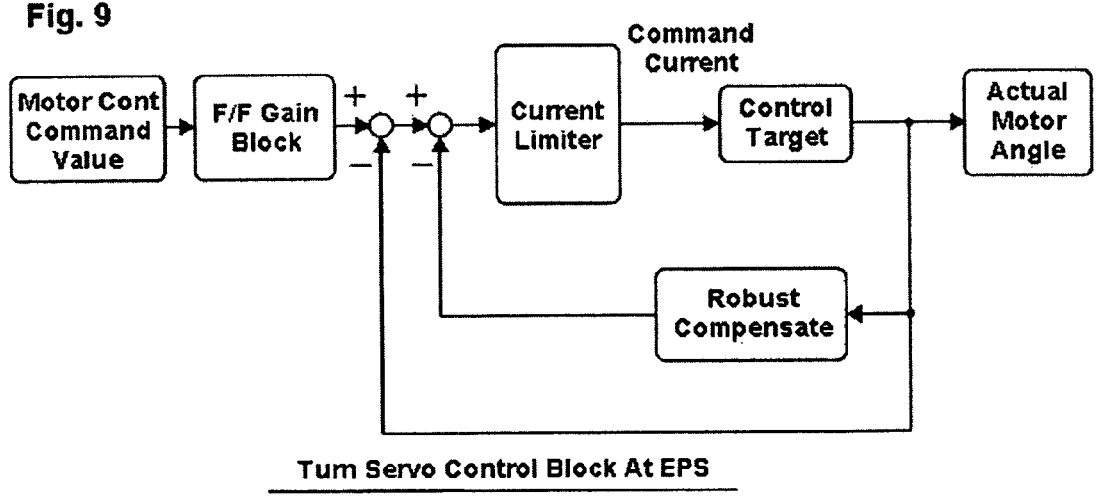
FIG. 9 is a block diagram showing turning servo control during EPS control according to the illustrated embodiment.

FIG. 8 and FIG. 9 are block diagrams showing "Turning Control During EPS Control" and "Turning Servo Control During EPS Control", respectively (assist torque control during EPS control), performed by controllers 19,19 of the steering control system according to the illustrated embodiment. The following describes turning control during EPS control and turning control during recovery from EPS control to SBW control for the illustrated embodiment, with reference to FIGS. 8 and 9.

As shown in FIG. 8, with turning control during EPS control, steering assist torque Ta is set by gain map or chart and steering torque Th input from steering wheel 6, and limiter processing is executed to set the motor control command value. Then, as shown in FIG. 9, based on the turning servo control derived from feed forward control+feed back control+robust compensation, the command current is obtained from the motor control command value, and turning motor 14 is driven.

As shown in the turning control block diagram of FIG. 8, turning control during recovery from EPS control to SBW control is performed by adding turning torque correction value ΔT at first switch SW1 activation to ON at time of clutch OFF operation (period between release command and release completion). At this point, turning torque correction value ΔT is calculated by combining steering angular velocity gain Gdθ, axial force change gain GdF, and vehicle motion amount gain GdY with turning torque correction standard value ΔT0. (See FIGS. 15 to 18.)

Figure 10:
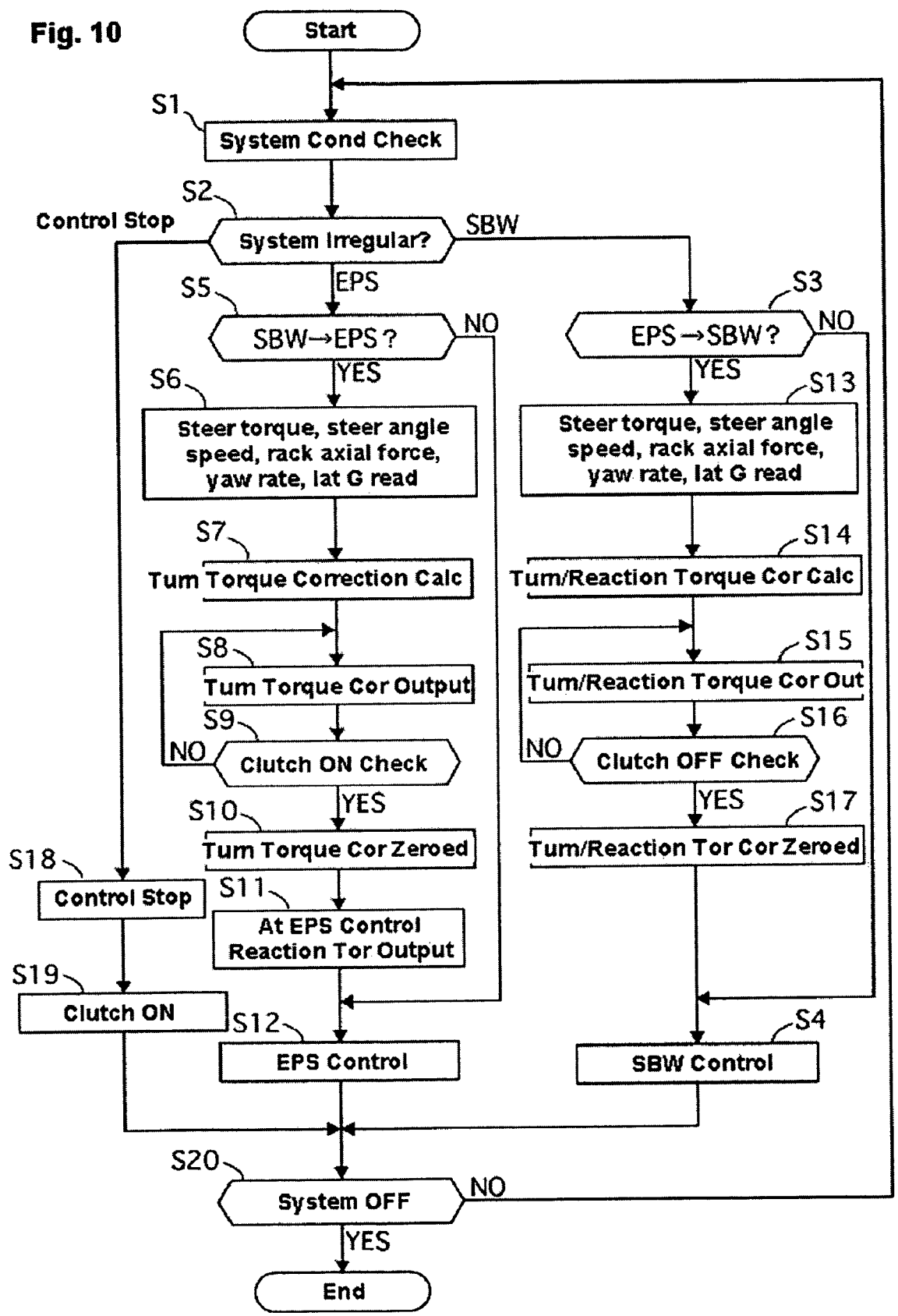
FIG. 10 is a flowchart showing a switching control process according to the illustrated embodiment.

FIG. 10, "Switching Control Process", is a flowchart showing the switching control process executed by controllers 19,19 according to the illustrated embodiment, and the following is a description of each of its steps. Furthermore, this process is executed (switching control unit) at a predetermined control cycle, such as 10 msec.

At Step S1, the controller confirms the control condition of the steer-by-wire mechanism, and the process advances to Step S2.

At Step S2, following the condition confirmation of Step S1, the controller determines whether or not an irregularity is present in the steer-by-wire mechanism, and the process advances to Step S3 if the system is normal, or it advances to Step S5 upon system irregularity for the level capable of maintaining EPS control, at system check, at failure diagnosis, and at turning that approaches the maximum turning angle, etc., or it advances to Step S18 at system failure incapable of maintaining EPS control. Specifically, Step S2 confirms the SBW control condition and executes judgment for performing condition transition. That determination is the judgment serving to perform as a system check and the judgment executed at failure diagnosis. If normal, the system operates with SBW control after system start, and condition transition to EPS control will be required at execution of backup mechanism check. Aside from these situations, at system failure during SBW control, transition from SBW control to EPS control will be required as a redundant system for avoiding sudden system down from SBW control to manual steering (control suspended).

At Step S3, following the determination that system condition is normal at Step S2, the controller determines whether or not there was recovery from EPS control to SBW control, and the process advances to Step S13 when YES or to Step S4 when NO.

At Step S4, following the determination of whether SBW control is active by clutch OFF at Step S3, normal SBW control is executed by turning torque control and steering reaction force control, and the process advances to Step S20.

At Step S5, when Step S2 determined that predetermined conditions (system irregularity, system check, failure diagnosis, maximum turning angle, etc.) have been met for shifting to EPS control, the controller determines whether or not there was a shift from SBW control to EPS control, and the process advances to Step S6 if YES and to Step S12 if NO. Upon advancement to Step S5, first the engagement command for backup clutch 9 is generated, and then shift transition control progresses from SBW control to EPS control by turning torque correction control through Steps S6 to S10, and steering reaction force control at Step S11, and the system shifts to EPS control.

Step S6, the process determines if there was control shift from SBW control to EPS control at Step S5, and turning torque correction characteristics steering torque, steering angular velocity, rack axial force change, yaw rate, and lateral G are read, and the process advances to Step S7.

At Step S7, after reading the input information for turning torque correction at Step S6, turning torque correction value ΔT is computed, and the process advances to Step S8. At this point, turning torque correction value ΔT is combined steering angular velocity gain Gdθ, axial force change gain GdF, and vehicle motion amount gain GdY with turning torque correction standard value ΔT0 by the following formula.

$$\Delta T = \Delta TO \times Gd\theta \times GdF \times GdY$$

The following describes the computation of each value.

Figure 11:
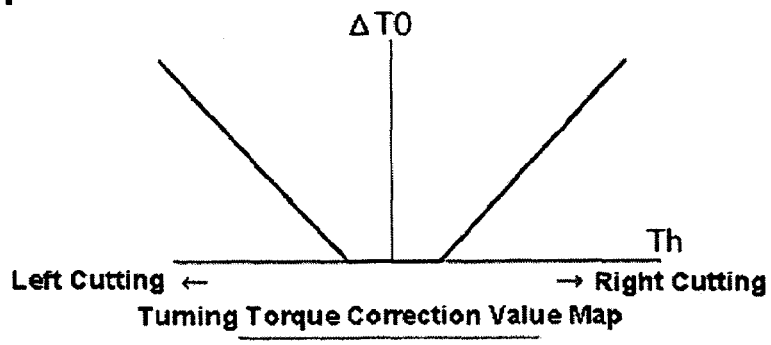
FIG. 11 is a turning torque correction value map or chart for steering torque utilized by turning torque correction control during the shift transition period from SBW control to EPS control according to the illustrated embodiment.

Turning torque correction standard value ΔTO for turning torque correction value ΔT computed during the backup clutch 9 engagement transition period is obtained by referring to the turning torque correction value map or chart showing steering torque Th in FIG. 11. This turning torque correction value map or chart is established with the characteristic that the value increases as steering torque Th on the right cutting side or the left cutting side. In short, to the extent that steering torque Th input through steering wheel 6 by the driver increases, turning torque correction standard value ΔTO is given a larger value.

Figure 12:
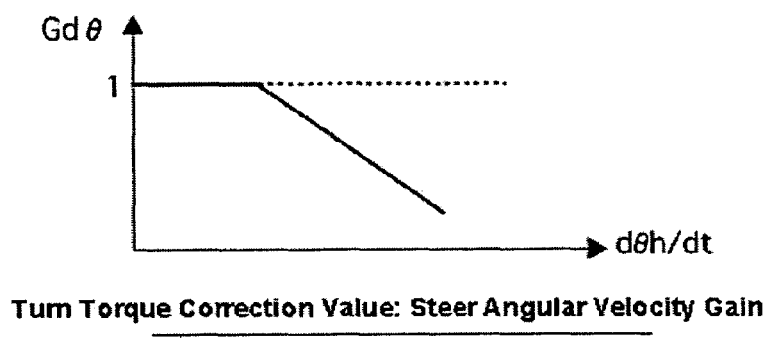
FIG. 12 is a graph showing steering angular velocity gain in relation to steering angular velocity utilized by turning torque correction control of the shift transition period from SBW control to EPS control according to the illustrated embodiment.

Steering angle speed gain Gdθ adjusts turning torque correction standard value ΔTO, as shown in FIG. 12, and a value of 1 is attributed to the area wherein steering angular velocity dθh/dt is below the set value, and when steering angular velocity dθh/dt exceeds the set value, a value smaller than 1 is attributed to the extent that steering angular velocity dθh/dt increases.

Figure 13:
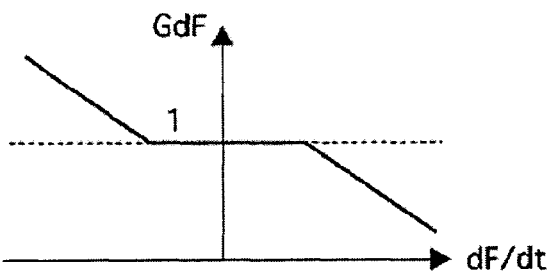
FIG. 13 is a graph showing axial force change gain in relation to rack axial force change utilized by turning torque correction control of the shift transition period from SBW control to EPS control according to the illustrated embodiment.

Axial force change gain GdF adjusts turning torque correction standard value ΔTO, as shown in FIG. 13, and when the axial force direction of rack axial force change dF/dt is in the positive direction (increasing), a value smaller than 1 is given to the extent of the increase, and when the axial force direction of rack axial force change dF/dt is in the negative direction (decreasing), a value larger than 1 is given to the extent of the decrease.

Figure 14:
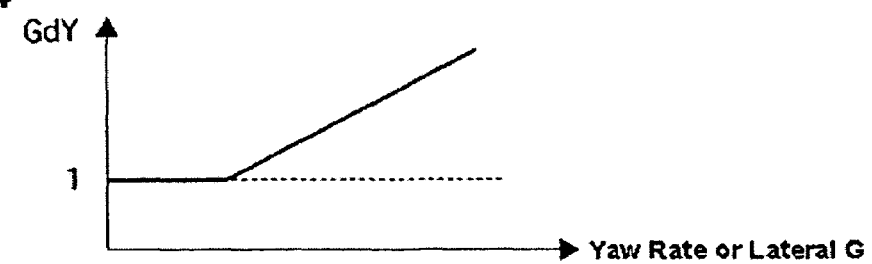
FIG. 14 is a graph showing vehicle motion amount gain in relation to vehicle motion amount utilized by turning torque correction control of the shift transition period from SBW control to EPS control according to the illustrated embodiment.

Vehicle motion amount gain GdY adjusts turning torque correction standard value ΔTO, as shown in FIG. 14, and a value of 1 is attributed to the area wherein the yaw rate or lateral G is below the set value, and when the yaw rate or lateral G exceeds the set value, a value larger than 1 is attributed to the extent that the yaw rate or lateral G increases.

At Step S8, following the computation of turning torque correction value ΔT at Step S7, the controller outputs computed turning torque correction value ΔT and advances to Step S9. At this point, output of turning torque correction value ΔT is for the subtraction of turning torque correction value ΔT from the turning torque command value at SBW control, as shown in FIG. 4, and turning torque correction value ΔT can be expressed as the turning torque reduction correction value of SBW control.

At Step S9, following output of turning torque correction value ΔT at Step S8, the controller confirms whether backup clutch 9 has been completely operated or not, and the process advances to Step S11 if YES and it returns to Step S8 if NO.

At Step S10, following backup clutch 9 completed engagement confirmation at Step S9, turning torque correction value ΔT is overwritten to zero, and the process advances to Step S11. At this point, after backup clutch 9 has completed engagement, overwriting turning torque correction value ΔT to zero, as shown in FIG. 8, signifies shifting to turning torque (steering assist torque) at EPS control as a unit of assisting turning motor 14.

At Step S11, following the zero overwriting of turning torque correction value ΔT at Step S10, the controller outputs the reaction force torque value for EPS control, and the process advances to Step S12. At this point, the output of the reaction force value for EPS control, as shown in FIG. 6, is targeted for shifting to EPS control after backup clutch 9 completion of engagement, and steering reaction force is made zero (normal steering reaction force control stop) or the reaction force assigned direction is assigned torque in the opposite direction to the steering assist direction (reaction force motor 5 and turning motor 14 act as an assist unit).

At Step S12, following the output of the reaction force torque value for EPS control at Step S11, the controller operates backup clutch 9, and EPS control is executed, which is steering assistance control as a unit of assisting at least one of reaction force motor 5 and turning motor 14. This EPS control is performed by assigning only by turning motor 14 the steering assist torque Ta obtained by the control block shown in FIG. 8, or by assigning the same by turning motor 14 and reaction force motor 5, or by assigning it only by reaction force motor 5 when turning motor 14 is in failure mode.

At Step S13, following the determination that there is recovery from EPS control to SBW control at Step S3, input information is read for correction of turning torque and steering reaction force torque, namely steering torque, steering angular velocity, rack axial force change, yaw rate, and lateral G, and the process advances to Step S14. Moreover, at the shift from Step S3 to Step S13, the engagement start command for backup clutch 9 is generated at Step S3.

At Step S14, following reading of input information for turning torque and steering reaction force correction at Step S13, the controller computes turning torque correction value ΔT and steering reaction force torque correction value ΔT', and the process advances to Step S15 (turning torque correction component and steering reaction force torque correction component). At this point, turning torque correction value ΔT combines steering angular velocity gain Gdθ, axial force change gain GdF, and vehicle motion amount gain GdY with turning torque correction standard value ΔTO, as calculated by the following formula.

$$\Delta T = \Delta TO \times Gd\theta \times GdF \times GdY$$

The following describes the computation of each value.

Figure 15:
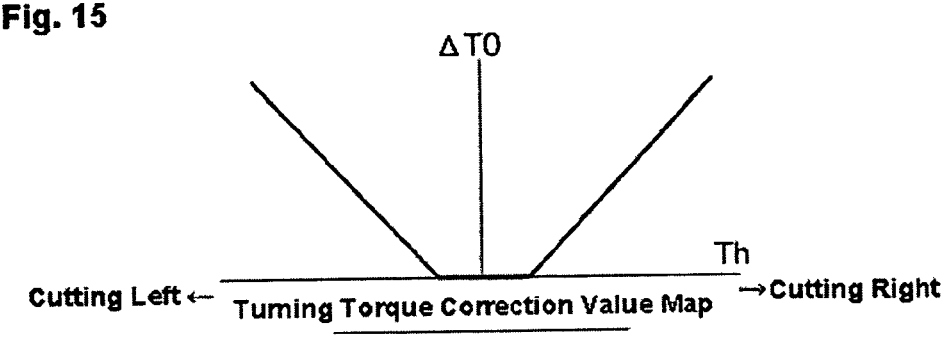
FIG. 15 is a turning torque correction value map or chart for steering torque utilized by turning torque correction control of the recovery transition period from EPS control to SBW control according to the illustrated embodiment.

Turning torque correction standard value ΔTO of turning torque correction value ΔT added to the release transition period for backup clutch 9 is obtained by referring to the turning torque correction value map or chart showing steering torque Th in FIG. 15. This turning torque correction value map or chart is set with the characteristic that the value increases as steering torque Th is larger on the right cutting side or left cutting side. In short, to the extent that steering torque Th input through steering wheel 6 by the driver increases, turning torque correction standard value ΔTO is given a larger value.

Figure 16:
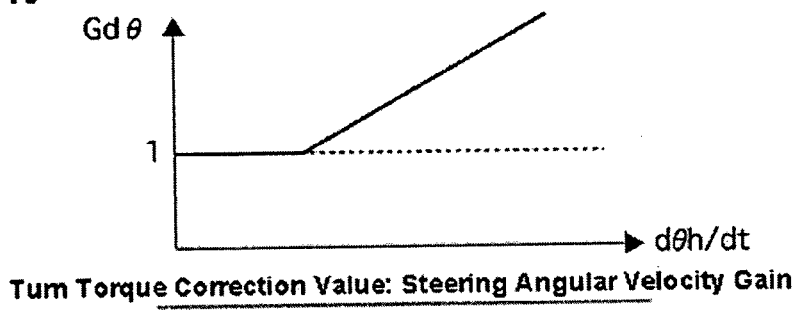
FIG. 16 is a graph showing steering angular velocity gain in relation to steering angular velocity utilized by turning torque correction control of the recovery transition period from EPS control to SBW control according to the illustrated embodiment.

Steering angle speed gain Gdθ adjusts turning torque correction standard value ΔTO, as shown in FIG. 16, and a value of 1 is attributed to the area wherein steering angular velocity dθh/dt is below the set value, and when steering angular velocity dθh/dt exceeds the set value, a value larger than 1 is attributed to the extent that steering angular velocity dθh/dt increases.

Figure 17:
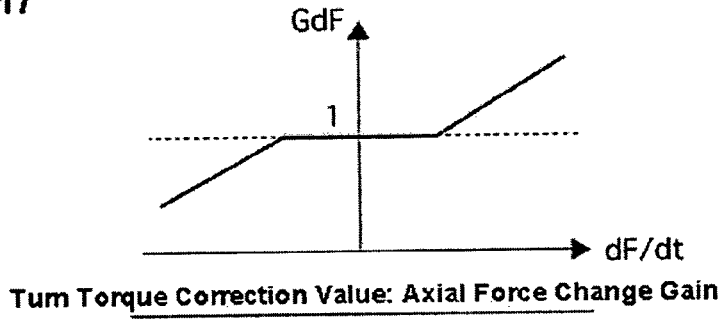
FIG. 17 is a graph showing axial force change gain in relation to rack axial force change utilized by turning torque correction control of the recovery transition period from EPS control to SBW control according to the illustrated embodiment.

Axial force change gain GdF adjusts turning torque correction standard value ΔTO, as shown in FIG. 17, and when the axial force direction of rack axial force change dF/dt is in the positive direction (increasing), a value larger than 1 is given to the extent of the increase, and when the axial force direction of rack axial force change dF/dt is in the negative direction (decreasing), a value smaller than 1 is given to the extent of the decrease.

Figure 18:
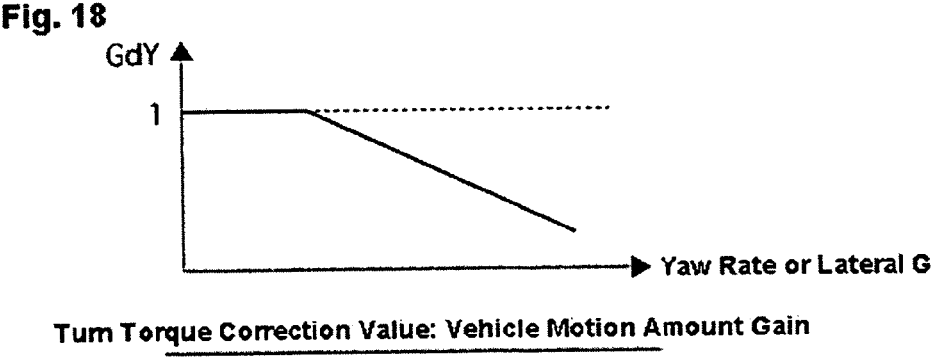
FIG. 18 is a graph showing vehicle motion amount gain in relation to vehicle motion amount utilized by turning torque correction control of the recovery transition period from EPS control to SBW control according to the illustrated embodiment.

Vehicle motion amount gain GdY adjusts turning torque correction standard value ΔTO, as shown in FIG. 18, and a value of 1 is attributed to the area wherein the yaw rate or lateral G is below the set value, and when the yaw rate or lateral G exceeds the set value, a value smaller than 1 is attributed to the extent that the yaw rate or lateral G increases.

In addition, steering reaction force torque correction value ΔT' combines steering angular velocity gain G1dθ axial force change gain G1dF, and vehicle motion amount gain G1dY with steering reaction force torque correction standard value ΔT1, as calculated by the following formula.

$$\Delta T' = \Delta T1 \times G1d\theta \times G1dF \times G1dY$$

The following describes the computation of each value.

Figure 19:
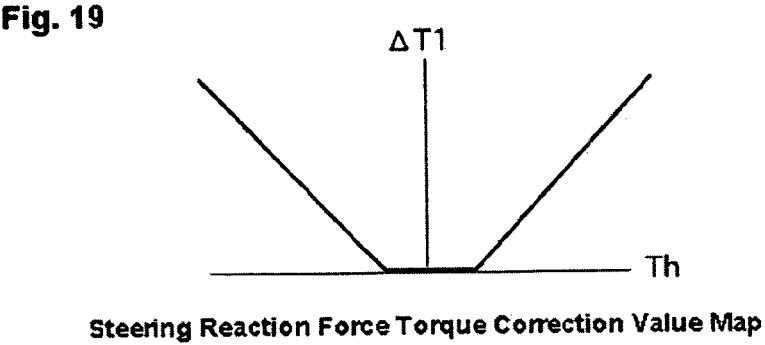
FIG. 19 is a steering reaction force torque correction value map or chart for steering torque utilized by steering reaction force torque correction control of the recovery transition period from EPS control to SBW control according to the illustrated embodiment.

Steering reaction force correction standard value ΔT1 for steering reaction force correction value ΔT' computed during backup clutch 9 release transition period is obtained by referring to the steering reaction force correction value map or chart showing steering torque Th in FIG. 19. This steering reaction force correction value map or chart is set with the characteristic that the value is larger as steering torque Th is larger on the right cutting side or left cutting side. In short, to the extent that steering torque Th input through steering wheel 6 by the driver increases, steering reaction force torque correction standard value ΔT1 is given a larger value.

Furthermore, it is acceptable to regard the steering reaction force correction value map or chart of FIG. 19 as identical to the turning torque correction value map or chart of FIG. 15.

Figure 20:
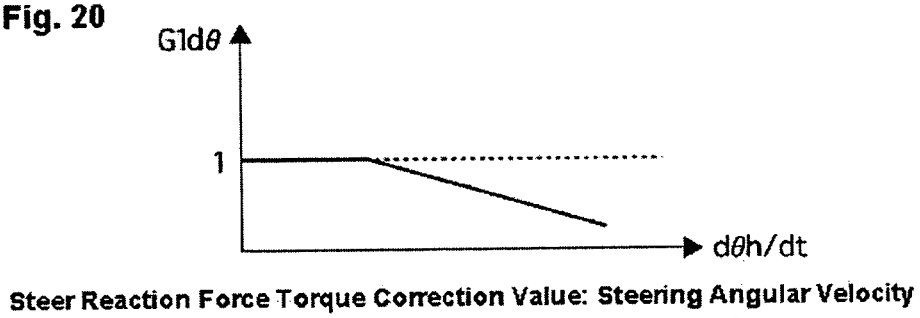
FIG. 20 is a graph showing steering angular velocity gain in relation to steering angular velocity utilized by steering reaction force torque correction control of the recovery transition period from EPS control to SBW control according to the illustrated embodiment.

Steering angle speed gain G1dθ adjusts steering reaction force torque correction standard value ΔT1, as shown in FIG. 20, and a value of 1 is attributed to the area wherein steering angular velocity dθh/dt is below the set value, and when steering angular velocity dθh/dt exceeds the set value, a value smaller than 1 is attributed to the extent that steering angular velocity dθh/dt increases.

Figure 21:
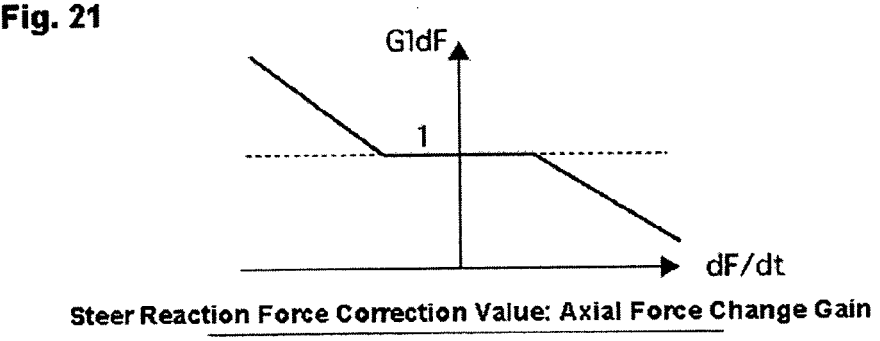
FIG. 21 is a graph showing axial force change gain in relation to rack axial force change utilized by steering reaction force torque correction control of the recovery transition period from EPS control to SBW control according to the illustrated embodiment.

Axial force change gain G1dF adjusts steering reaction force torque correction standard value ΔT1, as shown in FIG. 21, and when the axial force direction of rack axial force change dF/dt is in the positive direction (increasing), a value smaller than 1 is given to the extent of the increase, and when the axial force direction of rack axial force change dF/dt is in the negative direction (decreasing), a value larger than 1 is given to the extent of the decrease.

Figure 22:
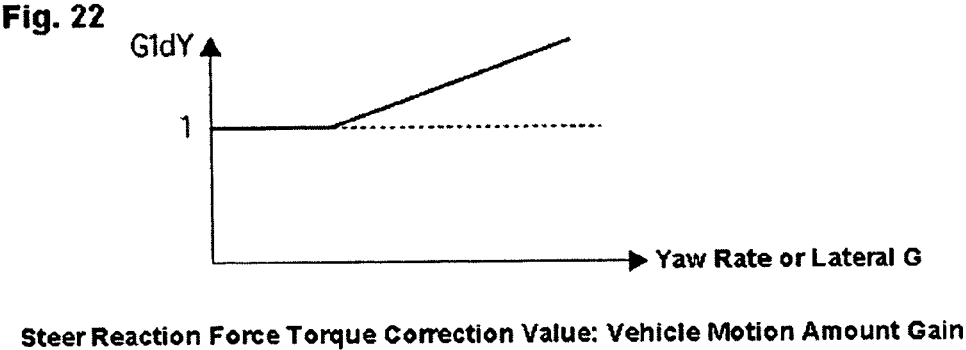
FIG. 22 is a graph showing vehicle motion amount gain in relation to vehicle motion amount utilized by steering reaction force torque correction control of the recovery transition period from EPS control to SBW control according to the illustrated embodiment.

Vehicle motion amount gain G1dY adjusts turning torque correction standard value ΔT1, as shown in FIG. 22, and a value of 1 is attributed to the area wherein the yaw rate or lateral G is below the set value, and when the yaw rate or lateral G exceeds the set value, a value larger than 1 is attributed to the extent that the yaw rate or lateral G increases.

At Step S15, following the computation of turning torque correction value ΔT and steering reaction force torque correction value ΔT' at Step S14, the controller outputs computed turning torque correction value ΔT and steering reaction force torque correction value ΔT' and the process advances to Step S16. At this point, output of turning torque correction value ΔT is for the addition of turning torque correction value ΔT to the turning torque command value at EPS control, as shown in FIG. 8, and turning torque correction value ΔT can be expressed as the turning torque augmentation correction value at recovery from EPS control to SBW control. In addition, output of steering reaction force torque correction value ΔT' is for the addition of steering reaction force torque correction value ΔT' to the steering reaction force torque command value at EPS control, as shown in FIG. 6, and steering reaction force torque correction value ΔT' can be expressed as the steering reaction force torque augmentation correction value at recovery from EPS control to SBW control.

At Step S16, following output of turning torque correction value ΔT and steering reaction force torque correction value ΔT' by Step S15, the controller confirms whether backup clutch 9 has been completely released or not, and the process advances to Step S17 if YES and it returns to Step S15 if NO.

At Step S17, following backup clutch 9 completed release confirmation at Step S16, turning torque correction value ΔT and steering reaction force torque correction value ΔT' are overwritten to zero, and the process advances to Step S4. At this point, after backup clutch 9 has completed release, overwriting turning torque correction value ΔT and steering reaction force torque correction value ΔT' to zero signifies shifting from EPS control as the assist unit for turning motor 14 to SBW control for application of turning torque for vehicle turning wheels 16,16 corresponding to steering conditions and application of steering reaction force torque for steering wheel 6 corresponding to turning conditions.

At Step S18, following a determination such as system failure at Step S2, both SBW control and EPS control are suspended, and the process advances to Step S19.

At Step S19, following control suspension at Step S18, the command for engaging backup clutch 9 is generated. Furthermore, backup clutch 9 is released by power source ON, the clutch is utilized for engagement by power source OFF, backup clutch 9 is engaged also at power source OFF caused by factors such as wire breakage, and there is no steering assist, but manual steering is assured to enable steering strictly by the operational force applied by the driver.

At Step S20, following Step S4 or Step S12 or Step S19, the controller determines whether or not the steer-by-wire mechanism is OFF (for example, at ignition OFF), and the process returns to Step S1 if NO and advances to end if YES.

When the system is operating normally, in the flowchart of FIG. 10 the process advances through Step S1→Step S2→Step S3→Step S4. At Step S3, the controller confirms through engagement/release of backup clutch 9 the SBW control by mechanical separation of the reaction force device and the turning device. At Step S4, SBW control is executed, by which is performed turning torque control for transmitting to turning motor 14 the control command to apply turning torque to the turning device corresponding to the steering condition of steering wheel 6 and by which is performed steering reaction force control for output to reaction force motor 5 the control command to apply steering reaction force torque to the reaction force device corresponding to the turning condition of vehicle turning wheels 16,16.

If a system irregularity is diagnosed during SBW control, in the flowchart of FIG. 10 the process advances through Step S1→Step S2→Step S5→Step S6→Step S7→Step S8→Step S9. Between start of engagement command output for backup clutch 9 at Step S5 and confirmation of engagement completion of backup clutch 9 at Step S9, the controller sets as the correction amount the increase in amount of turning torque to be applied to vehicle turning wheels 16,16 after engagement completion, and turning torque correction control for reduction correction of the turning torque at SBW control is executed.

If engagement completion of backup clutch 9 is confirmed at Step S9, in the flowchart of FIG. 10, the process advances from Step S9 through Step S10→Step S11→Step S12. Turning torque correction control is suspended at Step S10 and steering reaction force control at EPS control is processed at Step S11. At Step S12, control is switched from SBW control to EPS control as the assist unit to turning motor 14. After this occurs, the process repeats the flow by advancing from Step S12 through Step S20→Step S1→Step S2→Step S5→Step S12, and EPS control is maintained.

On the other hand, when conditions are attained for such operations as system check termination, failure diagnosis termination, or trimming back from maximum turning angle, in the flowchart of FIG. 10 the process advances through Step S1→Step S2→Step S3→Step S13→Step S14→Step S15→Step S16. Between start of engagement release command output for backup clutch 9 at Step S3 and confirmation of release completion of backup clutch 9 at Step S16, the controller sets as the correction amount the reduction equivalence of turning torque to be applied to vehicle turning wheels 16,16 after release completion, and turning torque correction control and steering reaction force torque correction control for augmentation correction of the turning torque and the steering reaction force torque at EPS control is executed.

Then, if release completion of backup clutch 9 is confirmed at Step S16, in the flowchart of FIG. 10 the process advances from Step S16 through Step S17→Step S4. Suspension of turning torque correction control and steering reaction force torque correction control is processed at Step S17, and the system recovers from EPS control to SBW control at Step S4. After that occurs, the process repeats the flow by advancing from Step S4 through Step S20→Step S1→Step S2→Step S3→Step S4, and SBW control is maintained.

Moreover, during SBW control and EPS control, when an event such as a system failure has occurred, in the flowchart of FIG. 10 the process advances from Step S1 through Step S2→Step S18→Step S19. SBW control or EPS control is suspended at Step S18. Backup clutch 9 is engaged and the system switches to manual steering at Step S19. Furthermore, when a factor such as a system failure has been generated during SBW control, it is acceptable to process EPS control, engage backup clutch 9 beforehand, and shift to manual steering.

Formerly, a period of time was required from the output of the linkage command to the linkage completion when linking a mechanical backup mechanism at shift from SBW control to EPS control. Specifically, when utilizing a backup clutch as a mechanical backup mechanism, a mechanical/electrical unique time constant was maintained until engagement of the input/output shaft, and a predetermined time period determined by the unique time constant was required between engagement command and engagement completion.

Figure 23:
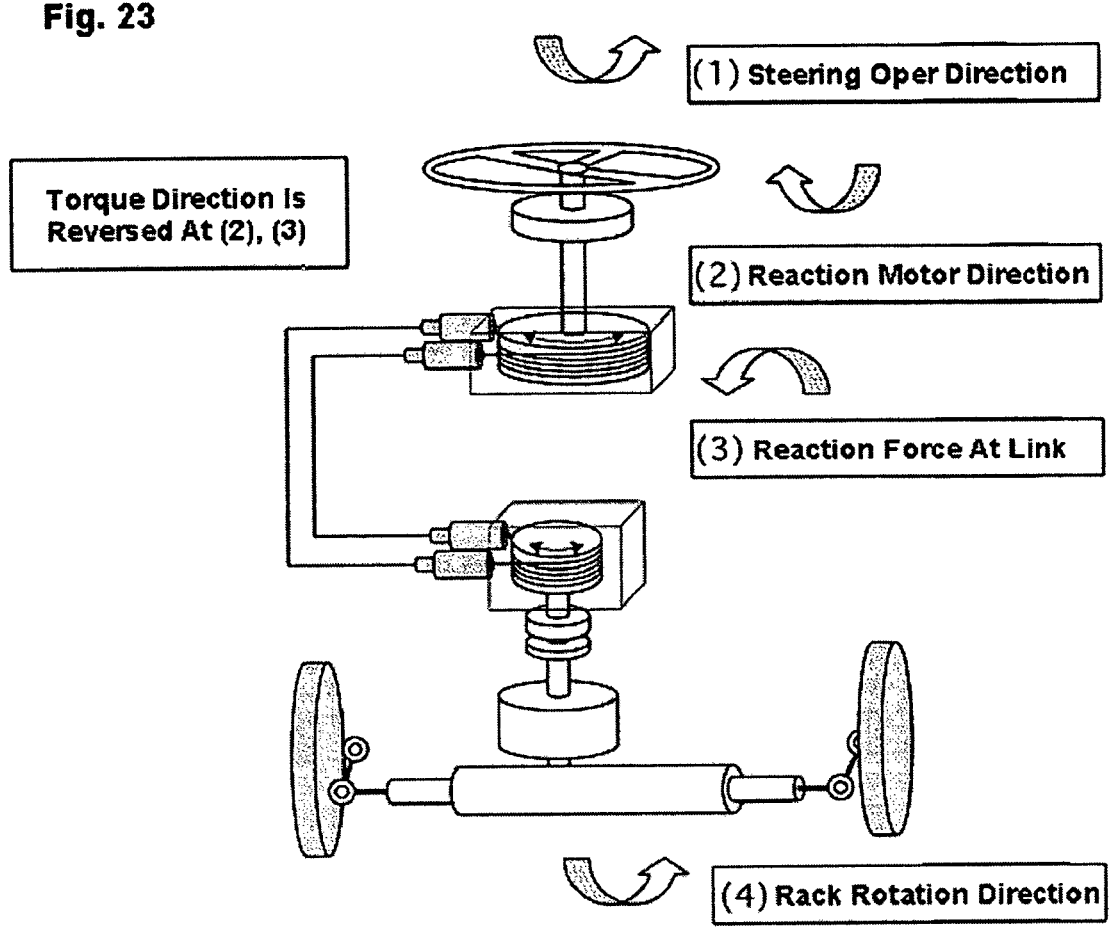
FIG. 23 is a schematic drawing showing torque directions at the time of a shift from SBW control to EPS control according to the illustrated embodiment.

In this way, there is no abrupt alteration in turning torque of EPS control at the shift from SBW control to EPS control, and at shift from SBW control to EPS control the reaction force component and turning component torque direction is the reverse of the steering component and rack rotation direction, as shown in FIG. 23. Formerly, turning torque during SBW control was maintained without modification between the engagement command and engagement completion for the backup clutch.

Figure 24:
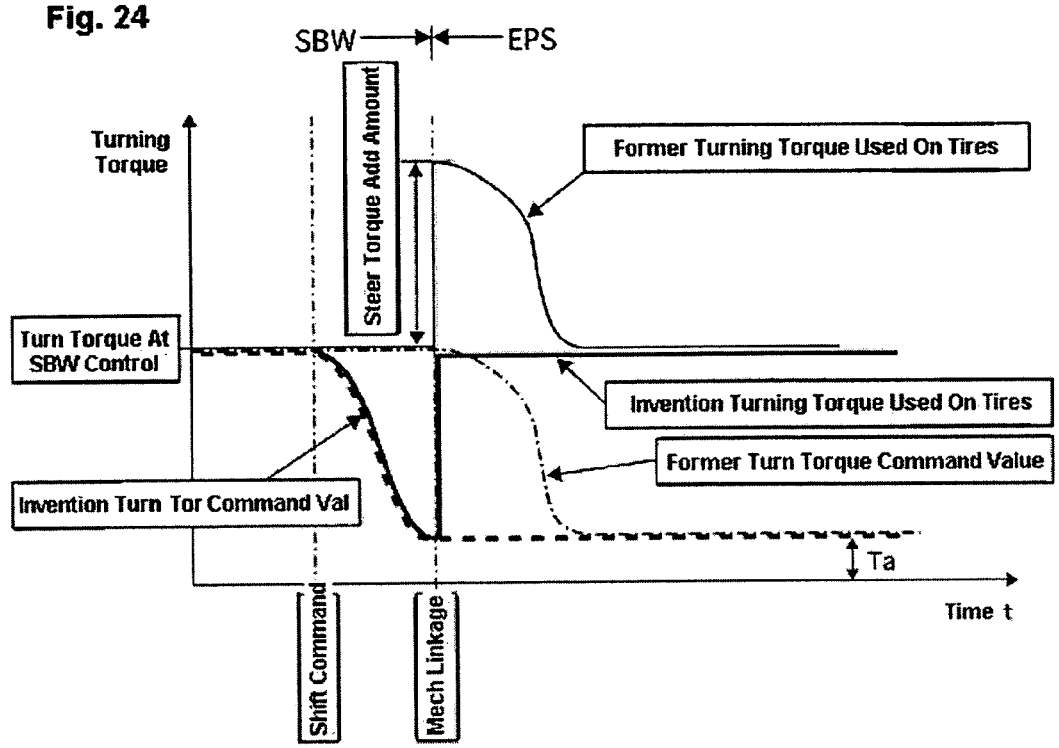
FIG. 24 is a time chart showing a comparison between former turning torque control and the turning torque correction control according to the illustrated embodiment at the time of a shift from SBW control to EPS control.

For this reason, and as shown for turning torque characteristics (thin solid line) to be applied to conventional tires in FIG. 24, after engagement completion by the backup clutch, the turning torque becomes that which has been added by the driver to the turning torque during SBW control, and after mechanical linkage, the turning torque is excessive and the vehicle turning wheels end up cutting more than the driver intended.

With a steering control system according to the illustrated embodiment, upon shifting from SBW control to EPS control, at the turning torque control side, as described above, between the start of output for the engagement command for backup clutch 9 and confirmation of engagement completion, the controller sets as the correction amount the enlargement amount (steering torque amount, etc.) for the turning torque to be applied to vehicle turning wheels 16,16 after engagement completion, turning torque correction control is executed for reduction correction of the turning torque during SBW control, and at completion of engagement of backup clutch 9, after that point, apply steering assist torque Ta is applied during EPS control.

For this reason, according to the illustrated embodiment of the present steering control system, as shown by the turning torque command value characteristics (dotted line) in FIG. 24, the controller starts lowering the command value from the shift command time point to EPS control, and operates to connect steering assist torque Ta at EPS control from the mechanical linkage time point. As shown in FIG. 24 by the turning torque characteristics (thick line) to be applied to the tires of the present steering control system, the turning torque at the mechanical linkage time point to EPS control is reduced by the addition of the steering torque amount, and the turning torque at SBW control to be applied to vehicle turning wheels 16,16 at the shift command time point to EPS control and the turning torque to be applied to vehicle turning wheels 16,16 at the mechanical linkage time point can be suppressed by reducing the torque decline difference.

Accordingly, at shift from SBW control to EPS control, the controller decreases the addition of turning torque after linkage completion of backup clutch 9, enabling prevention of turning of vehicle turning wheels 16,16 not intended by the driver.

Then, this turning torque correction value $\Delta T$ cancels out the additional amount of the steering torque by applying turning torque correction standard value $\Delta TO$ in relation to steering torque Th, and the turning torque to be applied to vehicle turning wheels 16,16 is maintained to be approximately the same at the linkage time point and the shift command time point to EPS control. Then steering angular velocity gain $Gd\theta$, axial force change gain GdF, and vehicle motion amount gain GdY, with the turning torque correction standard value $\Delta TO$ after shift to EPS control used as a base, is used for adjustment of cutting ease (turning torque reduction correction minimum) and cutting difficulty (turning torque reduction correction maximum) by the driver.

Figure 25:
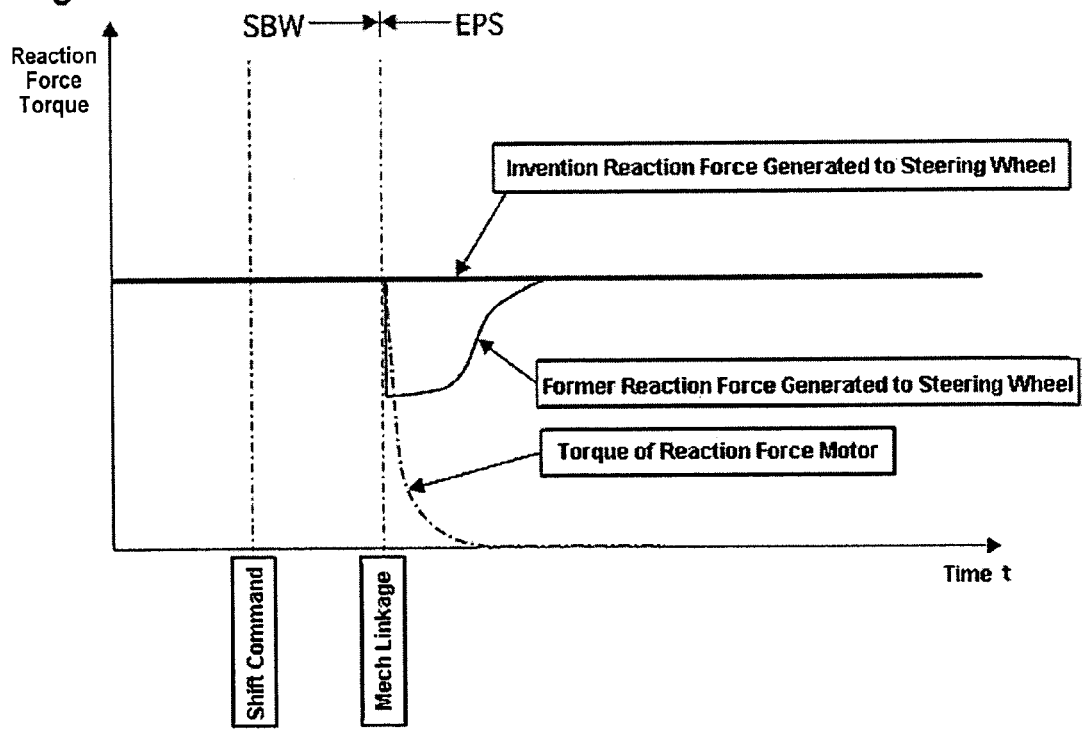
FIG. 25 is a time chart showing a comparison between former reaction force torque control and the reaction force torque correction control according to the illustrated embodiment at the time of a shift from SBW control to EPS control.

On the other hand, regarding reaction force torque, formerly, at the shift from SBW control to EPS control, in order to suspend reaction force control (torque counter-rotation of the reaction force motor) from the time of the engagement command, reaction force counter-rotation is executed early, and as shown by the reaction force characteristics (thin solid line) generated to the conventional steering wheel in FIG. 25, the reaction force torque was reduced after linkage completion by the backup clutch, and this imparted a sensation of removed reaction force to the driver.

At the shift from SBW control to EPS control, on the reaction force control side, as described above, when linkage completion for backup clutch 9 is confirmed, the reaction force torque is made zero or the torque of the reaction force motor is counter-rotated, so as to apply a small amount of torque in the steering torque direction.

For this reason, according to the illustrated embodiment of the present steering control system, as shown by the reaction force characteristics (thick line) generated to the steering wheel in FIG. 25, the reaction force torque characteristics show a smooth connection before and after mechanical linkage, and this prevents the sensation of reaction force removal by causing reaction force torque to counter-rotate early, and it prevents generation of reaction force shock by invoking reaction force torque counter-rotation response at a time point delayed from mechanical linkage.

Formerly, at recovery from EPS control to SBW control, when separating the mechanical backup mechanism, a period was required from the time of separation command output to the completion of separation. Specifically, when utilizing the backup clutch as a mechanical backup mechanism, a mechanical/electrical unique time constant was maintained until separation of the input/output shaft, and a predetermined time determined by the unique time constant was required between release command and release completion.

In this way, there is no abrupt alteration in turning torque of EPS control at the shift from EPS control to SBW control, and at the shift from EPS control to SBW control the reaction force component and turning component torque direction is the reverse of the steering component and rack rotation direction. Formerly, turning torque (assist torque) during EPS control was maintained without modification between the release command and release completion for the backup clutch.

Figure 26:
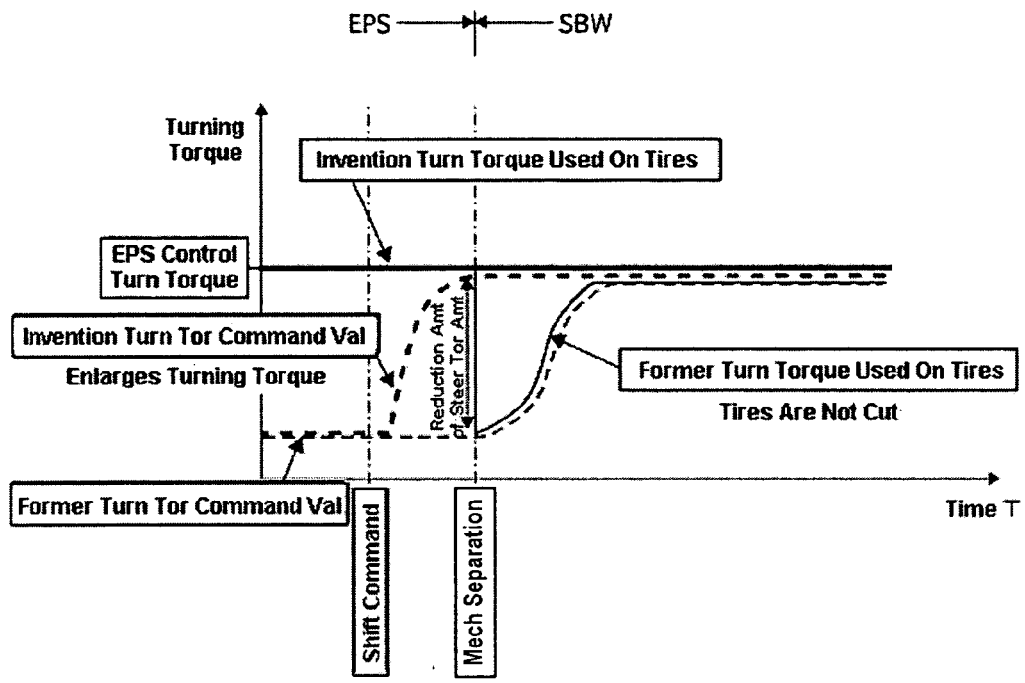
FIG. 26 is a time chart showing a comparison between former turning torque control and the turning torque correction control according to the illustrated embodiment at the time of recovery from EPS control to SBW control.

For this reason, as shown for turning torque characteristics (thin solid line) to be applied to conventional tires in FIG. 26, after mechanical separation by the backup clutch, only the turning torque is present during EPS control, and steering torque from the driver is removed, and after separation completion, the turning torque to be applied to the tires reduces steering torque, and the vehicle turning wheels end up cutting less than the driver intended.

Upon recovery from EPS control to SBW control, at the turning torque control side, as described above, between the start of output for the release command for backup clutch 9 and confirmation of release completion, the controller sets as the correction amount the reduction equivalence (steering torque amount, etc.) for the turning torque to be applied to vehicle turning wheels 16,16 after release completion, turning torque correction control is executed for augmentation correction of the turning torque at EPS control, and at completion of release of backup clutch 9, after that point, turning torque is connected for SBW control.

For this reason, as shown by the turning torque command value characteristics (dotted line) in FIG. 26, the controller starts increasing the command value from the shift command time point to SBW control, and operates to connect turning torque at SBW control from the mechanical separation time point. As shown in FIG. 26 by the turning torque characteristics (thick line) to be applied to the tires, the turning torque at the mechanical separation time point is suppressed by reduction of the steering torque amount, and the turning torque at EPS control to be applied to vehicle turning wheels 16,16 at the shift command time point to SBW control and the turning torque to be applied to vehicle turning wheels 16,16 at the mechanical separation time point can be suppressed by reducing the torque decline difference.

Accordingly, at the shift from EPS control to SBW control, the controller suppresses reduction of turning torque after release completion of backup clutch 9, enabling prevention of turning torque insufficiency for vehicle turning wheels 16,16 not intended by the driver.

Then, this turning torque correction value ΔT cancels out the reduction amount of the steering torque amount by applying turning torque correction standard value ΔTO in relation to steering torque Th, and the turning torque to be applied to vehicle turning wheels 16,16 is maintained to be approximately the same at the mechanical separation time point and the shift command time point to SBW control. Then steering angular velocity gain Gdθ, axial force change gain GdF, and vehicle motion amount gain GdY, with the turning torque correction standard value ΔTO after shift to SBW control used as a base, is used for adjustment of cutting ease (turning torque augmentation correction maximum) and cutting difficulty (turning torque reduction correction minimum) by the driver.

Figure 27:
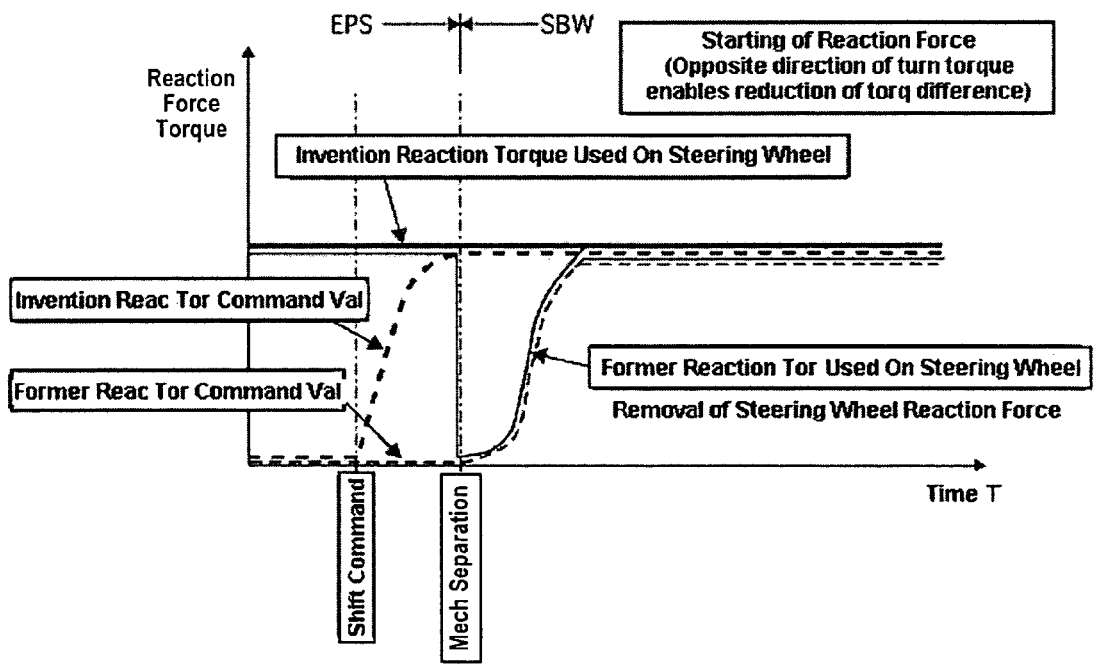
FIG. 27 is a time chart showing a comparison between former reaction force torque control and the reaction force torque correction control according to the illustrated embodiment at the time of recovery from EPS control to SBW control.

On the other hand, formerly, at recovery from EPS control to SBW control, in order to maintain steering reaction force control (zero) at EPS control until release completion, reaction force counter rotation was executed early, and as shown by the reaction force characteristics (thin solid line) transmitted to the conventional steering wheel in FIG. 27, the reaction force torque was reduced after mechanical release completion by the backup clutch, and this imparted a sensation of removed reaction force to the driver.

With the steering control system according to the illustrated embodiment, at recovery from EPS control to SBW control, at the steering reaction force torque control side, as described above, between the start of output of the release command for backup clutch 9 and confirmation of release completion, the controller sets as the correction amount the reduction equivalence of steering reaction force torque to be applied to steering wheel 6 after release completion, and it executes steering reaction force torque correction control to correct by enlarging the steering reaction force torque at EPS control, and after completion of release of backup clutch 9, operation connects to steering reaction force torque at SBW Control.

For this reason, as shown by the reaction force torque command value characteristics (dotted line) in FIG. 27, the controller starts increasing the command value from the shift command time point to SBW control, and operates to connect from mechanical separation time point to turning torque at SBW control. As shown in FIG. 27 by the reaction force torque characteristics (thick line) to be applied to the tires, the steering reaction force torque at the mechanical separation time point suppresses the reduction of turning torque amount, and this enables suppression by reducing the torque drop difference between steering reaction force torque at EPS control and steering reaction force torque to be applied to steering wheel 6 at mechanical separation time point.

Accordingly, at recovery from EPS control to SBW control, the controller suppresses reduction of steering reaction force torque after release completion of backup clutch 9, and this enables prevention of the imparting of the sensation of the removal of reaction force to the driver.

Then, in order that steering reaction force torque correction value ΔT' will be applied as torque in the opposing direction to steering torque correction value ΔT, the steering reaction force torque to be applied to steering wheel 6 is maintained to be approximately the same at the mechanical separation time point and the shift command time point to SBW control. Then steering angular velocity gain Gdθ, axial force change gain GdF, and vehicle motion amount gain GdY, with the turning torque correction standard value ΔT1 after shift to SBW control used as a base, is used for adjustment of cutting ease (steering reaction force torque augmentation correction minimum) and cutting difficulty (steering reaction force torque augmentation correction maximum) by the driver.

With the steering control system according to the illustrated embodiment, attainment of the following effects can be listed.

(1) Regarding a steering control system comprising a steering component including steering wheel 6 and reaction force motor 5, a turning component possessing vehicle turning wheels 16,16 and turning motor 14, between which mechanical linkage and separation are enabled through backup clutch 9, an SBW control unit executes separation of the backup clutch 9, and control of the turning motor 14 for setting the turning angle corresponding to the steering condition, and control of the reaction force motor 5 for applying steering reaction force corresponding to the turning condition, an EPS control unit for executing EPS control as an assist unit for at least either the reaction force motor 5 and/or the turning motor 14, and a control switching unit for shifting to EPS control in the event of attainment of predetermined conditions during SBW control, the above-mentioned switching unit, at shift from SBW control to EPS control, between the linkage command for backup clutch 9 and linkage completion, sets as the correction amount the increase equivalence of turning torque to be applied to the vehicle turning wheels 16,16 after linkage completion, and in order to correct by reducing turning torque at SBW control, at the shift from SBW control to EPS control, reduces the increase in turning torque for after separation completion of backup clutch 9, and enables prevention of turning of vehicle turning wheels 16,16 not intended by the driver.

(2) Because reaction force device torque sensor 3 is established for detecting steering torque Th being input to the steering component, and because the control switching unit possesses a turning torque correction component for setting a greater turning torque augmentation correction value to the extent that steering torque Th increases, the system enables suppression of the turning torque reduction amount of the steering torque amount after separation completion of backup clutch 9, and enables executing suitable turning torque augmentation correction to approximately match the turning torque to be applied to vehicle turning wheels 16,16 at the separation completion time point for backup clutch 9 to the turning torque at the release command time point for backup clutch 9.

(3) Because steering angular velocity detection means is established for detecting steering angular velocity dθh/dt of the steering component, and because the turning torque correction component enlarges the turning torque augmentation correction value to the extent that steering angular velocity dθh/dt increases, the system enables easy turning in response to steering response requests from the driver when steering speed is comparatively great.

(4) Because rack axial force change detection means is established for detecting rack axial force change dF/dt of the turning component, and because the turning torque correction component enlarges the turning torque augmentation correction value to the extent that rack axial force change dF/dt is in the increasing direction, and reduces the turning torque augmentation correction value to the extent that rack axial force change dF/dt is in the decreasing direction, the system enables easier turning for the turning torque side increased due to interference, and enables prevention of turning not intended by the driver at the turning torque side reduced due to interference.

(5) Because vehicle motion amount detection means is established for detecting vehicle motion amount (yaw rate or lateral G), and because the turning torque correction component reduces the turning torque augmentation correction value to the extent that the vehicle motion amount detection value is comparatively high, the system enables assurance of vehicle motion stability by the suppression of turning that exceeds driver intent when the yaw rate or lateral G increases.

(6) Because the control switching unit, at recovery from EPS control to SBW control, between the separation command for the backup clutch 9 and separation completion, sets as the correction amount the reduction equivalence of steering reaction force torque to be applied to the steering wheel 6 after separation completion, and performs augmentation correction of the steering reaction force torque at SBW control, the system enables reduction of reaction force removal during turning torque augmentation correction at recovery from EPS control to SBW control, and enables prevention of generation of the sensation of reaction force removal after separation completion of backup clutch 9.

(7) Because reaction force device torque sensor 3 is provided for detecting steering torque Th being input to the steering component, and because the control switching unit includes a steering reaction force torque correction component for setting a greater steering reaction force torque augmentation correction value to the extent that steering torque Th increases, the system enables suppression of the steering reaction force torque reduction amount after separation completion of backup clutch 9, and enables executing suitable steering reaction force torque augmentation correction to approximately match the steering reaction force torque to be applied to steering wheel 6 at the separation completion time point for backup clutch 9 to the steering reaction force torque at the release command time point for backup clutch 9.

(8) Because the control switching unit, at recovery from EPS control to SBW control, between the separation command for the backup clutch 9 and separation completion, performs augmentation correction of the steering reaction force torque at SBW control corresponding to the turning torque augmentation correction amount after separation completion, the system enables reduction of reaction force removal during turning torque augmentation correction at recovery from EPS control to SBW control, and enables prevention of generation of the sensation of reaction force removal after separation completion of backup clutch 9.

(9) Because steering angular velocity detection means is established for detecting steering angular velocity dθh/dt of the steering component, and because the steering reaction force torque correction component reduces the steering reaction force torque augmentation correction value to the extent that steering angular velocity dθh/dt increases, the system enables easy steering wheel steering in response to steering response requests from the driver when steering speed is comparatively great.

(10) Because rack axial force change detection means is established for detecting rack axial force change dF/dt of the turning component, and because the steering reaction force torque correction component reduces the steering reaction force torque augmentation correction value to the extent that rack axial force change dF/dt is in the increasing direction, and enlarges the steering reaction force torque augmentation correction value to the extent that rack axial force change dF/dt is in the decreasing direction, the system enables easier steering wheel steering for the turning torque side enlarged due to interference, and enables prevention of steering wheel steering not intended by the driver at the turning torque side reduced due to interference.

(11) Because vehicle motion amount detection means is established for detecting vehicle motion amount (yaw rate or lateral G), and because the steering reaction force torque correction component enlarges the steering reaction force torque augmentation correction value to the extent that the vehicle motion amount detection value is high, the system enables assurance of vehicle motion stability by the suppression of steering wheel steering that exceeds driver intent when yaw rate or lateral G increases.

With conventional steering control systems, after shifting from SBW control to EPS control, there is a return from EPS control to SBW control when predetermined conditions are attained (such as system check completion, failure diagnosis completion, trim back from maximum turning angle execution, etc.). However, problems surface in that at separation of the mechanical backup mechanism time is required from the generation of the separation command to the completion of separation. Because the change to SBW turning torque is not immediate, assist torque from the driver during EPS is reduced at return to SBW, and after the completion of separation, turning torque is insufficient, whereby the vehicle turning wheels do not turn to the extent intended by the driver.

Upon return to SBW control from steering assistance control, the present steering control system is capable of suppressing reduction of turning torque after completion of separation by the backup mechanism, and is capable of preventing insufficient cutting of the vehicle turning wheels not intended by the driver.

More particularly, in one exemplary approach the present SBW comprises a steering component having a steering wheel and a steering reaction force actuator, and a turning component having vehicle turning wheels and a turning actuator, the steering and turning components being mechanically linked and unlinked by operation of a backup mechanism. A SBW control unit is separable from the backup mechanism for SBW control of the turning actuator to a turning angle corresponding to the steering condition and control of the steering reaction force actuator to impart steering reaction force corresponding to the turning condition. A steering assistance control unit is provided for linking to the backup mechanism and for executing steering assistance control as an assistance unit for at least one of the steering reaction force actuator and the turning actuator. A control switching unit is provided for returning to SBW control upon attainment of predetermined conditions during steering assistance control. Upon shifting from steering assistance control to steer-by-wire control, between generation of the separation command and completion of separation by the backup mechanism, the control switching unit sets as the correction amount the reduction equivalence of the turning torque to be transmitted to the vehicle turning wheels after completion of separation and executes augmentation correction of the turning torque of the steering assistance control.

The illustrated embodiment is one in which the control switching unit, at recovery from EPS control to SBW control, between the separation command for the backup clutch and separation completion, performs augmentation correction of the turning torque at EPS control to the extent that turning torque increases. However, it would be acceptable, for example, to estimate the reduction equivalence of turning torque to be applied to the vehicle turning wheels after separation completion by use of steering angle and steering angular velocity and a road surface friction coefficient, etc., and to perform augmentation correction of the turning torque at EPS control with this as the correction amount. In effect, if an operation, at recovery from EPS control to SBW control, between the separation command for the backup clutch and separation completion, sets as the correction amount the reduction equivalence of turning torque to be applied to the vehicle turning wheels after separation completion and performs augmentation correction of the turning torque at EPS control, it is included in the present steering control system.

The illustrated embodiment is also one in which the control switching unit, at recovery from EPS control to SBW control, between the separation command for the backup clutch and separation completion, performs augmentation correction of the steering reaction force torque at EPS control to the extent that steering torque increases. However, it would be acceptable, for example, to estimate the reduction equivalence of steering reaction force torque to be applied to the steering wheel after separation completion by use of steering angle and steering angular velocity and a road surface friction coefficient, etc., and to perform augmentation correction of the steering reaction force torque at EPS control with this as the correction amount. In effect, if an operation, at recovery from EPS control to SBW control, between the separation command for the backup clutch and separation completion, sets as the correction amount the reduction equivalence of steering reaction force torque to be applied to the steering wheel after separation completion and performs augmentation correction of the steering reaction force torque at EPS control, it is within the scope of the present steering control system.

The illustrated embodiment is, further, one in which the system determines the turning torque augmentation correction value and steering reaction force torque augmentation correction value based on steering angular velocity, rack axial force change, and vehicle motion amount, but it would also be acceptable to determine the turning torque augmentation correction value and steering reaction force torque augmentation correction value based on condition amounts aside from those shown in the illustrated embodiment. In addition, it would be acceptable to apply the turning torque augmentation correction value and steering reaction force torque augmentation correction value unambiguously by following only the characteristics determined in advance for steering torque (FIG. 15 and FIG. 19). Furthermore, the steering reaction force torque augmentation correction value can also be calculated by multiplying the turning torque augmentation correction value by gain (for example, 0.8).

Still further, the illustrated embodiment is one in which a steering control system implemented in a steer-by-wire mechanism as a means of backing up the cable column and backup clutch, but as long as the system comprises a backup mechanism for enabling mechanical separation and linkage of a steering component and turning component, it may also be applied in steer-by-wire mechanisms other than the illustrated embodiment.

Thus, while the present steering control system has been described in connection with a certain specific embodiment thereof, this is by way of illustration and not of limitation, and the appended claims should be construed as broadly as the prior art will permit.

What is claimed:

1. A steering apparatus comprising:
   a steering wheel;
   turning wheels that are selectively turned according to a steering angle of the steering wheel;
   a backup mechanism including a clutch for alternately mechanically separating and linking the steering wheel and the turning wheels;
   a turning actuator, linked to the turning wheels, that turns the turning wheels according to the steering angle of the steering wheel;
   a steering reaction force actuator, linked to the steering wheel, for assigning a reaction torque to the steering wheel according to a turning torque assigned to the turning wheels by the turning actuator; and
   a control unit configured to control the backup mechanism, the steering reaction force actuator, and the turning actuator, wherein the control unit includes:
      a steer-by wire control configured to, when the steering wheel and the turning wheels are mechanically separated from each other by the backup mechanism so that the turning wheels are turned by the turning actuator according to the steering angle, assign the reaction torque to the steering wheel;
      a steering assistance control configured to, when the steering wheel and the turning wheels are mechanically linked by the backup mechanism so that a steering torque inputted from the steering wheel is transferred to the turning wheels via the backup mechanism, assign an assistance force to at least one of the steering reaction force actuator and the turning actuator so as to assist turning of the turning wheels according to the steering torque inputted from the steering wheel;
      a switching control configured to generate a shift command instructing the clutch to one of mechanically separate and link the steering wheel and the turning wheels for alternately switching between the steer-by wire control and the steering assistance control when a predetermined condition is met; and
      a correction control configured to correct the turning torque assigned to the turning wheels by the turning actuator in response to the shift command by at least one of:
         reducing the turning torque provided by the turning actuator after the shift command instructs the clutch to shift from the steer-by wire control to the steering assistance control and before the clutch mechanically links the steering wheel and the turning wheels; and
         increasing the turning torque provided by the turning actuator after the shift command instructs the clutch to shift from the steering assistance control to the steer-by wire control and before the clutch mechanically separates the steering wheel and the turning wheels.

2. The steering apparatus according to claim 1, further comprising:
   a steering angular velocity sensor configured to detect a steering angular velocity of the steering wheel,
   wherein the control unit is configured to reduce a correction amount to the turning torque as the steering angular velocity increases.

3. The steering apparatus according to claim 2, wherein the control unit is configured to increase the reaction torque applied to the steering wheel by the steering reaction actuator after the shift command instructs the clutch to shift from the steering assistance control to the steer-by wire control according to the correction amount to the turning torque applied to the turning wheel by the turning actuator.

4. The steering apparatus according to claim 3, further comprising:
a steering angular velocity sensor configured to detect a steering angular velocity of the steering wheel; and the control unit configured to increase a correction amount to the turning torque applied to the turning wheels as the steering angular velocity detected by the steering angular velocity sensor increases.

5. The steering apparatus according to claim 1, wherein the steering reaction force actuator includes a steering angle sensor, an encoder, a torque sensor, a Hall IC and a reaction force motor.

6. The steering apparatus according to claim 5, wherein the steering angle sensor employs an absolute-type resolver.

7. The steering apparatus according to claim 5, wherein the torque sensor is arranged between the steering angle sensor and the reaction force motor.

8. The steering apparatus according to claim 1, further comprising:
a steering torque sensor configured to detect steering torque input from the steering wheel; and
the correction control including a steering torque correction component configured to set a greater steering torque reduction correction value to the extent that the detected steering torque increases.

9. The steering apparatus according to claim 8, further comprising:
a rack axial force change sensor configured to detect a rack axial force change of the steering torque reduction correction value, to decrease the steering torque reduction correction value to the extent that the rack axial force change is in an increasing direction and to increase the steering torque reduction correction value to the extent that the rack axial force change is in a decreasing direction.

10. The steering apparatus according to claim 9, further comprising:
a steering angle detection sensor configured to detect the steering angle of the steering wheel; and the steering torque correction component configured to selectively decrease the steering torque reduction correction value to the extent that the detected steering angle increases.

11. A steering apparatus for a vehicle including a steering wheel, turning wheels selectively turned according to a steering angle of the steering wheel, a backup mechanism including a clutch for alternately mechanically separating and linking the steering wheel and the turning wheels, a turning actuator configured to turn the turning wheels according to the steering angle, and a steering reaction force actuator configured to assign a reaction torque to the steering wheel according to a turning torque assigned to the turning wheels by the turning actuator, the apparatus comprising:
means for performing steer-by-wire control by assigning the reaction force torque to the steering wheel by the steering reaction force actuator according to the turning torque when the steering wheel and the turning wheels are mechanically separated from each other by the clutch so that the turning wheels are turned by the turning actuator according to the steering angle;
means for performing steering assistance control by assigning an assistance force so as to assist turning of the turning wheels according to steering torque inputted from the steering wheel by at least one of the steering reaction force actuator and the turning actuator when the steering wheel and the turning wheels are mechanically linked by the clutch so that a steering torque input from the steering wheel is transferred to the turning wheels via the clutch;
means for generating a shift command instructing the clutch to alternatively switch between the steer-by wire control and the steering assistance control when a predetermined condition is met; and
means for correcting the turning torque assigned to the turning wheels by the turning actuator including at least one of:
means for reducing the turning torque assigned to the turning wheels after the shift command instructs the clutch to shift from the steer-by-wire control to the steering assistance control and before the clutch mechanically links the steering wheel and the turning wheels; and
means for increasing the turning torque assigned to the turning wheels via the clutch after the shift command instructs the clutch to shift from the steering assistance control to the steer-by-wire control and before the clutch mechanically separates the steering wheel and the turning wheels.

12. A steering method for a vehicle including a steering wheel, turning wheels selectively turned according to a steering angle of the steering wheel, a backup mechanism including a clutch for alternately mechanically separating and linking the steering wheel and the turning wheels, a turning actuator configured to turn the turning wheels according to the steering angle, and a steering reaction force actuator configured to assign a reaction torque to the steering wheel according to a turning torque assigned to the turning wheels by the turning actuator, the method comprising:
performing steer-by-wire control by assigning the reaction force torque to the steering wheel by the steering reaction force actuator according to the turning torque when the steering wheel and the turning wheels are mechanically separated from each other by the clutch so that the turning wheels are turned by the turning actuator according to the steering angle;
performing steering assistance control by assigning an assistance force so as to assist turning of the turning wheels according to steering torque inputted from the steering wheel by at least one of the steering reaction force actuator and the turning actuator when the steering wheel and the turning wheels are mechanically linked by the clutch so that a steering torque input from the steering wheel is transferred to the turning wheels via the clutch;
generating a shift command instructing the clutch to alternatively switch between the steer-by wire control and the steering assistance control when a predetermined condition is met; and
correcting the turning torque assigned to the turning wheels by the turning actuator including at least one of:
reducing the turning torque assigned to the turning wheels after the shift command instructs the clutch to shift from the steer-by-wire control to the steering assistance control and before the clutch mechanically links the steering wheel and the turning wheels; and
increasing the turning torque assigned to the turning wheels via the clutch after the shift command instructs the clutch to shift from the steering assistance control to the steer-by-wire control and before the clutch mechanically separates the steering wheel and the turning wheels.

* * * * *